(12) United States Patent
Tan et al.

(10) Patent No.: US 11,368,838 B2
(45) Date of Patent: Jun. 21, 2022

(54) GATEWAY SYSTEM, CONTROL PLANE GATEWAY DEVICE, AND COMMUNICATION METHOD

(71) Applicant: HUAWEI TECHNOLOGIES CO., LTD., Guangdong (CN)

(72) Inventors: Shiyong Tan, Guangdong (CN); Weihua Hu, Guangdong (CN); Liping Yuan, Guangdong (CN); Jin Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 664 days.

(21) Appl. No.: 14/579,793

(22) Filed: Dec. 22, 2014

(65) Prior Publication Data

US 2015/0110095 A1    Apr. 23, 2015

Related U.S. Application Data

(63) Continuation of application No. PCT/CN2012/077960, filed on Jun. 29, 2012.

(51) Int. Cl.
*H04W 12/00* (2021.01)
*H04L 41/0806* (2022.01)
(Continued)

(52) U.S. Cl.
CPC ......... *H04W 12/00* (2013.01); *H04L 41/0806* (2013.01); *H04L 61/2007* (2013.01);
(Continued)

(58) Field of Classification Search
CPC .. H04L 61/2007; H04W 24/02; H04W 88/16; H04W 40/02–40/22; H04W 28/02–28/14
See application file for complete search history.

(56) References Cited

U.S. PATENT DOCUMENTS

2005/0054343 A1   3/2005   Nykanen et al.
2009/0022102 A1   1/2009   Nykanen et al.
(Continued)

FOREIGN PATENT DOCUMENTS

CN   1510960 A   7/2004
CN   1801965 A   7/2006
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3GPP TS 23.401, V11.2.0, pp. 1-285, 3rd Generation Partnership Project, Valbonne, France (Jun. 2012).

(Continued)

*Primary Examiner* — Hoon J Chung
(74) *Attorney, Agent, or Firm* — Leydig, Voit & Mayer, Ltd.

(57) ABSTRACT

Embodiments of the present invention provide a gateway system and a communication method. The gateway system includes: a control plane entity, connected or integrated with a mobility management network element, and configured to allocate an IP address to UE and configure a data path for connecting a user plane entity with an RAN, a PDN or another gateway; one or more user plane entities, located between the PDN and the RAN, independent of the control plane entity, configured to forward data on the data path configured by the control plane entity. The gateway system is composed of the control plane entity and the user plane entity which are independent of each other, the number of the user plane entities may be independently changed to adapt to the change of network traffic without replacing all (Continued)

gateway entities, the network deployment is more convenient and the cost is lower.

23 Claims, 12 Drawing Sheets

(51) Int. Cl.
*H04L 9/40* (2022.01)
*H04L 61/5007* (2022.01)
*H04W 40/02* (2009.01)
*H04L 61/503* (2022.01)
*H04L 61/5014* (2022.01)
*H04L 41/04* (2022.01)

(52) U.S. Cl.
CPC .............. *H04L 63/20* (2013.01); *H04W 40/02* (2013.01); *H04L 41/04* (2013.01); *H04L 61/203* (2013.01); *H04L 61/2015* (2013.01)

(56) References Cited

U.S. PATENT DOCUMENTS

| | | |
|---|---|---|
| 2009/0111458 A1 | 4/2009 | Fox et al. |
| 2009/0252133 A1 | 10/2009 | Watanabe |
| 2010/0208733 A1 | 8/2010 | Zhao et al. |
| 2011/0238547 A1* | 9/2011 | Belling .................. G06Q 30/04 |
| | | 705/34 |
| 2012/0081557 A1* | 4/2012 | Kupinsky ........... H04L 12/1407 |
| | | 348/207.1 |
| 2012/0157047 A1* | 6/2012 | Chen ...................... H04L 63/08 |
| | | 455/411 |
| 2015/0052234 A1* | 2/2015 | Hahn .................. H04L 61/6013 |
| | | 709/223 |

FOREIGN PATENT DOCUMENTS

| | | |
|---|---|---|
| CN | 1846406 A | 10/2006 |
| CN | 101106579 A | 1/2008 |
| WO | WO2010004295 A2 * | 1/2010 |

OTHER PUBLICATIONS

"3$^{rd}$ Generation Partnership Project; Technical Specification Group Services and System Aspects; General Packet Radio Service (GPRS); Service Description; Stage 2 (Release 11)," 3GPP TS 23.060, V11.2.0, pp. 1-335, 3$^{rd}$ Generation Partnership Project, Valbonne, France (Jun. 2012).
1$^{st}$ Office Action and Search Report in corresponding Chinese Patent Application No. 201280000540 (dated Aug. 3, 2016).

* cited by examiner

100

GATEWAY SYSTEM, CONTROL PLANE GATEWAY DEVICE, AND COMMUNICATION METHOD

CROSS-REFERENCE TO RELATED APPLICATIONS

This application is a continuation of International Patent Application No. PCT/CN2012/077960, filed on Jun. 29, 2012 which is hereby incorporated by reference in its entirety.

FIELD OF THE INVENTION

Embodiments of the present invention relate to the field of wireless communications, and in particular to a gateway system, device and a communication method.

BACKGROUND OF THE INVENTION

A universal terrestrial radio access network (UTRAN) is used for realizing a radio access function in a universal mobile terrestrial service (UMTS) network. The UTRAN generally includes a plurality of radio network controllers (RNC) and a radio transmission node NodeB. A GSM/EDGE radio access network (GERAN) is used for realizing a radio access function in a general packet radio service (GPRS) network. The GERAN generally includes a plurality of base stations and a base station controller (BSC). A serving general packet radio service supporting node (SGSN) is used for realizing the functions of routing forwarding, mobility management, session management, user information storage and the like in the GPRS/UMTS network. A gateway general packet radio service supporting node (GGSN) is used for connecting external packet data networks (PDN). These PDNs may be internet, a virtual private network (VPN), an internet protocol (IP) multimedia service (IMS) network, or a wireless application protocol (WAP) network provided by an operator. A home location register (HLR) is used for storing user's subscription information and authentication data about network services. The SGSN, the GGSN and the HLR are generally regarded as network elements of a core network. The core network generally has a plurality of network elements such as the SGSN, the GGSN and the HLR. The architecture and flow of the GPRS network are described in a 3GPP TS 23.060 standard.

User equipment (UE) is accessed to the UTRAN or GERAN through a wireless air interface. The UE initiates a process of requesting attachment to the SGSN through the UTRAN/GERAN first. The SGSN acquires subscription data and authentication data of a user from the HLR. After the SGSN completes authentication of the user, the SGSN informs the UE of attachment acceptance. When the UE needs to use a service, the UE initiates a request for establishing a packet data protocol context (PDP Context) to the SGSN. The PDP Context is used for managing a GPRS tunnel protocol (GTP) for transmitting user data between the SGSN and the GGSN. The SGSN finds the associated GGSN according to an access point name (APN) used in the subscription information, and requests the GGSN to establish the PDP Context. After the GGSN receives the request for establishing the PDP Context, the GGSN returns an IP address and a GTP tunnel end identifier (TEID) which are allocated to the UE to the SGSN. The SGSN returns a PDP Context establishment success message to the UE, and informs the UTRAN or GERAN of establishing a corresponding wireless air interface connection for transmitting the user data. The uplink data of the UE passes through the SGSN via the UTRAN/GERAN, and is forwarded to the corresponding PDN by the GGSN. The downlink data from the external PDN is transmitted to the SGSN where the UE is located by the GGSN according to the IP address of the UE through a corresponding GTP tunnel, and sent to the UE by the SGSN through the GERAN/UTRAN.

Generally, a general computing platform is more suitable for processing control plane signaling of mobility management, session management (namely PDP management) and the like. The performance of a router platform composed of dedicated hardware on the aspect of processing data forwarding of a user plane is very strong and generally exceeds more than ten times that of the general computing platform, but the signaling processing performance of the router platform is very weak. For furthest improving the forwarding throughput of the user data, a gateway, such as the GGSN and the like, often adopts the router platform. Whereas the SGSN is mainly used for processing control plane signaling of the user equipment, and often adopts the general computing platform.

At the R99-R6 stages of a 3GPP standard version, the SGSN takes charge of processing the mobility management signaling and session management signaling of a control plane, and also takes charge of forwarding user plane data from the RNC to the GGSN. The SGSN which generally adopts the general computing platform has very strong signaling processing capability but very weak data forwarding capability. Once the traffic of the user data is quickly increased, the SGSN needs to continually expand the capacity or the number of the SGSNs needs to be greatly increased, so that the cost is very high.

For this purpose, at the R7 stage of the 3GPP standard version, the data of the user plane is directly sent from the RNC to the GGSN in a manner of establishing a direct tunnel between the GGSN and the RNC, and is forwarded to the external Internet by the GGSN. Under such a scenario, the SGSN mainly processes the signaling of the control plane, and no longer forwards the data of the user plane. However, under the scenario limitation that the direct tunnel can not be established between some RNC and GGSN where the user roams and the like, the SGSN must reserve a part of a forwarding function of the user plane to forward the data of the user plane, thus increasing the complexity of the SGSN.

To overcome these defects, at the R8 stage of the 3GPP standard version, a brand-new evolution network is developed, including: an evolved universal terrestrial radio access network (E-UTRAN), for realizing all functions related to radio of the evolution network; a mobility management entity (MME), for taking charge of mobility management of the control plane, which includes user context and mobility state management, allocating a temporary mobile subscriber identity (TMSI) and the like; a serving gateway (S-GW), which is a user plane anchor point between 3GPP access networks and an interface for terminating E-TURAN; a packet data network gateway (P-GW), which is a user plane anchor point between a 3GPP access network and a non-3GPP access network and is an interface for an external packet data network (PDN). A home subscriber server (HSS) is used for storing subscription information of a user. The MME, the S-GW, the P-GW and the HSS are generally regarded as network elements of a core network.

After the user equipment is accessed to the E-UTRAN through a wireless air interface, the user equipment is attached to the MME first, and the MME acquires the subscription data and authentication information of the user from the home subscriber server (HSS) and initiates a process of authenticating the UE. After the MME completes the authentication process, the user equipment or MME initiates a process of establishing a bearer for transmitting user data. In this process, the MME informs the S-GW of establishing the bearer for the user, and an informing message carries the address of the P-GW and the address information of the E-UTRAN network element where the user is located. The S-GW establishes the bearer for transmitting the user data from the E-UTRAN to the P-GW for the user. The P-GW forwards the downlink data from the external PDN to the UE through the bearer, and forwards the uplink data from the UE to the corresponding PDN.

To enable the access networks of the existing UTRAN and GERAN to be compatible, the UE may be accessed to the MME through the UTRAN or the GERAN and the SGSN, and a GTP tunnel connection between the UE and the S-GW may be established through the UTRAN/GERAN and SGSN. The S-GW converts the GTP tunnel into a corresponding bearer for connecting the P-GW and transmitting the user data. The UTRAN may also establish a GTP tunnel for directly connecting the S-GW.

The MME becomes a network element only for processing control plane signaling, and the S-GW and the P-GW mainly take charge of forwarding the user plane data. The S-GW and the P-GW may be combined into a network element, which is generally referred to as a gateway.

With development of mobile internet services, abundance of enterprise network services and fusion of mobile access networks of multiple systems, gateway device needs to be gradually developed towards more delicate service control and charging on the basis that a basic data forwarding function is completed, so as to support richer service implementation and control of the operator. In the evolution network, a gateway still needs to reserve a large number of external signaling interfaces. These signaling interfaces include a GTP-C bearer interface between the MME and the gateway, a policy control and charging (PCC) interface between the PCRF and the gateway, a charging interface between a charging system and the gateway, a lawful interception interface between lawful interception device and the gateway, a DHCP interface between a DHCP (Dynamic Host Configuration Protoco) server and the gateway, an interface between an AAA (Authentication, Authorization and Accounting) server and the gateway, and an L2TP (Layer Two Tunneling Protocol)/GRE (Generic Routing Encapsulation) protocol interface between a VPN and the gateway.

Massive external signaling interfaces of the gateway will bring massive interface signaling. When the gateway using a router as a platform processes the massive interface signaling, the gateway is limited by a hardware platform, so the performance of processing the signaling is very low, and particularly, a dedicated routing forwarding processor chip hardly has any capability of processing the signaling. In order that the gateway can process the massive interface signaling, a large number of hardware, such as a general computing processor chip and the like, is bound to added on the router platform, so that the hardware platform of the gateway device is very complex, and the cost is too high, thus being adverse to popularization and deployment of the mobile packet data network.

SUMMARY OF THE INVENTION

Embodiments of the present invention provide a gateway system, device and a communication method, which may flexibly deploy a mobile packet data network.

In a first aspect, a gateway system is provided, including a control plane entity and at least one user plane entity, wherein the control plane entity is configured to allocate an internet protocol IP address to user equipment UE, generate configuration information of a data path according to the IP address and send the configuration information of the data path to the user plane entity, and the data path is used for connecting the user plane entity with a radio access network RAN, a packet data network PDN or other network elements; the user plane entity is located between the PDN and the RAN, connected with the control plane entity and configured to receive the configuration information of the data path sent by the control plane entity and forward uplink and downlink data of the UE on the data path according to the configuration information of the data path.

In a second aspect, control plane gateway device is provided, including: an internet protocol IP address allocating module, configured to allocate an IP address to user equipment UE; and a data path configuring module, configured to generate configuration information of a data path according to the IP address allocated by the IP address allocating module and send the configuration information of the data path to user plane gateway device, the data path is used for connecting the user plane gateway device with a radio access network RAN, a packet data network PDN or other network elements, wherein the user plane gateway device is located between the PDN and the RAN.

In a third aspect, user plane gateway device is provided, including: a data path managing module, connected with control plane gateway device, and configured to receive configuration information of a data path from the control plane gateway device and manage the data path according to the configuration information of the data path; and a data forwarding module, connected with the data path managing module, and configured to forward uplink and downlink data of user equipment UE on the data path managed by the data path managing module, wherein the data path is used for connecting the user plane gateway device with a radio access network RAN, a packet data network PDN or other network elements, and the user plane gateway device is located between the PDN and the RAN and is independent of the control plane gateway device.

In a fourth aspect, a communication method in a gateway system is provided. The gateway system includes a control plane entity and at least one user plane entity, wherein the control plane entity is independent of the user plane entity, and the user plane entity is located between a packet data network PDN and a radio access network RAN. The method includes: the control plane entity allocates an internet protocol IP address to user equipment UE, generates configuration information of a data path according to the IP address, and sends the configuration information of the data path to the user plane entity, wherein the data path is used for connecting the user plane entity with the radio access network RAN, the packet data network PDN or other network elements; the user plane entity receives the configuration information of the data path sent by the control plane entity, and forwards uplink and downlink data of the UE on the data path.

The gateway system of the embodiments of the present invention is composed of the control plane entity and the user plane entity which are independent of each other, the control plane entity takes charge of the configuration of the data path, and the user plane entity takes charge of data forwarding on the data path, so that the number of the user plane entities may be independently changed to adapt to the change of network traffic without replacing all gateway entities, the network deployment is more convenient and the cost is lower.

BRIEF DESCRIPTION OF THE DRAWINGS

To illustrate the technical solutions in the embodiments of the present invention more clearly, a brief introduction on the accompanying drawings which are needed in the description of the embodiments or the prior art will be given below. Apparently, the accompanying drawings in the description below are merely some of the embodiments of the present invention, based on which other drawings may be obtained by those of ordinary skill in the art without any creative effort.

DETAILED DESCRIPTION OF THE EMBODIMENTS

Figure 1:
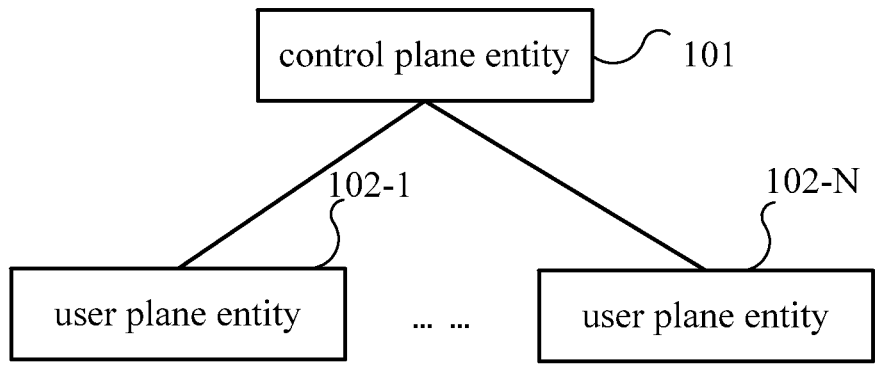
FIG. 1 is a block diagram of a gateway system of an embodiment of the present invention.

A clear and complete description of technical solutions in the embodiments of the present invention will be given below in conjunction with the accompanying drawings in the embodiments of the present invention. Obviously, the embodiments described are merely a part, but not all, of the embodiments of the present invention. All of other embodiments, obtained by those of ordinary skill in the art based on the embodiments in the present invention without any creative effort, fall into the protection scope of the present invention.

The technical solutions of the present invention may be applied to various communication systems, such as a global system of mobile communication (GSM), a code division multiple access (CDMA) system, wideband code division multiple access wireless (WCDMA), a general packet radio service (GPRS), long term evolution (LTE) and the like.

User equipment (UE) may also be called as a mobile terminal, mobile user equipment and the like, and can communicate with one or more core networks through a radio access network (for example, RAN). The user equipment may be a mobile terminal such as a mobile phone (or called as "cell" phone) and a computer with a mobile terminal, for example, may be a portable, pocket-type, handheld, computer built-in or vehicle-mounted mobile device, which exchanges languages and/or data with the radio access network.

The radio access network may include one or more base station systems. The base station system of the radio access network may include one or more BTS (Base Transceiver Station) supporting GSM or CDMA and a base station switch center (BSC), may also include one or more NodeB supporting WCDMA and an RNC (radio network controller), and may also be one or more evolutional NodeB (eNB or e-NodeB, evolutional Node B) supporting LTE, which is not limited in the present invention.

A mobility management network element may be an SGSN in a UTRAN or a GERAN, or an MME in an E-UTRAN, or an SGSN, an MME or a combination of the both during joint networking of a UTRAN/GERAN or an E-UTRAN, which is not limited in the present invention.

In the embodiments of the present invention, when a component is "connected" with another component as described, the two components may be directly connected with each other, or indirectly connected with each other through one or more other components. The direct or indirect connection above may include connections in wired and/or wireless manners. The wired manner may include but not limited to cables composed of various media, such as optical fibers, conductive cables, semiconductor lines or the like; or include other manners, such as internal buses, circuits, back boards and the like. The wireless manner is a connection manner capable of realizing wireless communication, including but not limited to radio frequency, infrared, Bluetooth and the like. An internal or external interface may exist between the two components, and the interface may be a physical interface or a logic interface.

FIG. 1 is a block diagram of a gateway system of an embodiment of the present invention. The gateway system 100 of FIG. 1 includes a control plane entity 101 and one or more user plane entities 102-1 to 102-N, wherein N is a positive integer. Hereinafter, if different user plane entities do not need to be distinguished, the user plane entities 102-1 to 102-N may be collectively called as a user plane entity 102.

The control plane entity 101 is configured to allocate an IP address to UE and configure a data path for connecting the user plane entity 102 with a radio access network (RAN), a packet data network (PDN) or other network elements according to the IP address. Exemplarily, the configuring the data path according to the IP address may include: configuration information of the data path is generated according to the IP address allocated to the UE, and the data path is sent to the user plane entity 102.

The control plane entity may be connected or integrated with a mobility management entity. The control plane entity may also be connected with a serving gateway (S-GW), and the serving gateway is connected with the mobility management entity.

In addition, the control plane entity (GW-C) may be called as a control plane gateway, a gateway controller, a control node or a control gateway.

The control plane entity 101 is integrated with a mobility management network element, which indicates that the control plane entity 101 and the mobility management network element may be realized on one platform. The control plane entity 101 is connected with the mobility management network element, which indicates that the control plane entity 101 and the mobility management network element may be realized by independent platforms and are connected with each other, but the platforms for realizing the both may be of the same type or different types, which is not limited in the embodiment of the present invention.

The user plane entity 102 is located between the PDN and the RAN and connected with the control plane entity 101. The user plane entity 102 is configured to receive the configuration information of the data path sent by the control plane entity 101 and forward uplink and downlink data of the UE on the data path configured by the control plane entity 101.

In addition, the user plane entity (GW-U) may be called as a user plane gateway, a packet data forwarding gateway, a forwarding node or a switch node.

In other words, the user plane entity 102 is a node connected by the data path, but the control plane entity 101 is not the node connected by the data path.

As another embodiment of the present invention, the functions of the control plane entity 101 and the user plane entity 102 of this system may be further expanded.

Exemplarily, the control plane entity 101 may be further configured to acquire load information of a plurality of user plane entities from the plurality of user plane entities or network management network elements, select the user plane entity with the lightest load from the plurality of user plane entities, generate the configuration information of the data path according to the IP address and the information of the user plane entity with the lightest load, and send the configuration information of the data path to the user plane entity with the lightest load.

Exemplarily, the control plane entity 101 may be further configured to acquire an IP address resource from the user plane entity or from the internal configuration of the control plane entity, and allocate the IP address to the UE from the IP address resource.

Exemplarily, the control plane entity 101 may be further configured to forward an IP message between the user plane entity and the PDN.

Exemplarily, the user plane entity 102 may be further configured to collect use information of the data path, and send the use information to the control plane entity; and correspondingly, the user plane entity 102 may further be configured to receive the use information, generate a charging data record according to the use information and report the charging data record to a charging system.

Exemplarily, the control plane entity 101 may further be configured to acquire policy information from an internal configuration or a policy and charging rule function (PCRF) device outside the control plane entity and acquire QoS information from the policy information, wherein the configuration information of the data path includes the QoS information; and correspondingly, the user plane entity 102 may further be configured to control the quality of service of the uplink and downlink data of the UE according to the QoS information when the uplink and downlink data of the UE are forwarded on the data path.

Accordingly, the gateway system of the embodiment of the present invention is composed of the control plane entity and the user plane entity which are independent of each other, the control plane entity takes charge of the configuration of the data path, and the user plane entity takes charge of data forwarding on the data path, so that the number of the user plane entities may be independently changed to adapt to the change of network traffic without replacing all gateway entities, the network deployment is more convenient and the cost is lower. Meanwhile, because a control plane and user plane separated architecture is adopted, compared with the original gateway device, the design and realization of the device are simplified, and the processing performance is improved.

For example, when the average traffic per user of the mobile wideband in the future is greatly increased, the traffic may be shared only by simply increasing the user plane entity without excessively reforming the control plane entity, so that the network deployment is simpler and more reliable.

Optionally, as an embodiment, a group or multiple groups of gateway systems 100 may exist in a communication system and replace all of or part of functions of the S-GW, the P-GW or the GGSN on the whole or replace a random combination of the functions.

Figure 2:
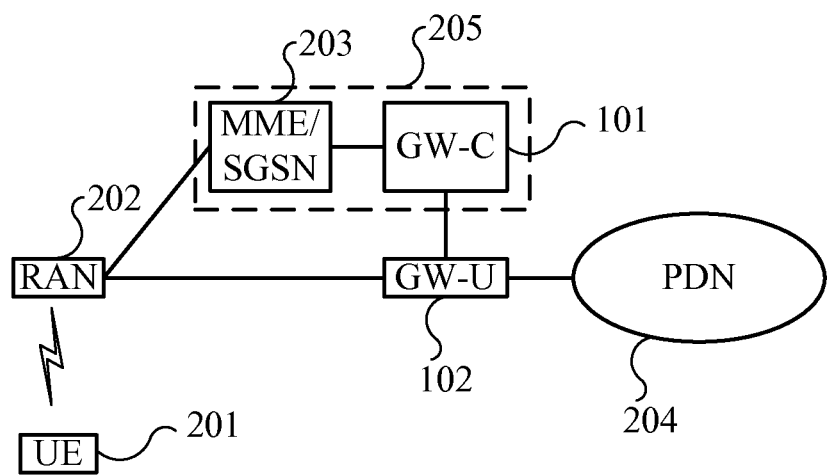
FIG. 2 is a schematic structural diagram of a communication system applicable to the gateway system of the embodiment of the present invention.

FIG. 2 is a schematic structural diagram of a communication system applicable to the gateway system of the embodiment of the present invention. For the purpose of briefness, only one control plane entity (GW-C) 101 and one user plane entity (GW-U) 102 of a group of gateway system are described in the communication system 200 of FIG. 2, but in the communication system of the embodiment of the present invention, the numbers of the gateway systems, the control plane entities and the user plane entities are not limited.

Moreover, the communication system 200 further includes UE 201, an RAN 202, a mobility management network element 203, a PDN 204 and the like. The number of these network elements is also not limited in the embodiment of the present invention.

The RAN 202 may include access network elements of various systems (such as a GERAN, a UTRAN or an E-UTRAN), such as an RNC, an eNodeB and the like. The PDN 204 may be in the form of WAP, Internet, a VPN and the like, which is not limited in the embodiment of the present invention.

Optionally, as an embodiment, the control plane entity 101 may be realized by a general computing platform, and the user plane entity 102 may be realized by a dedicated router platform. The general computing platform is suitable for processing interface signaling; and the signaling processing capability of the dedicated router platform is relatively low, but the data forwarding efficiency is relatively high. In this way, the design of the hardware platform may be simplified, the cost of the hardware platform is reduced, and the processing performances of the control plane entity and the user plane entity of the gateway are greatly improved.

The mobility management network element 203 may be an MME and/or an SGSN, and is generally realized by the general computing platform. Accordingly, as another embodiment, the control plane entity 101 and the mobility control network element 203 may be integrated together, as shown in a dotted box 205 of FIG. 2, so that the number of network elements in the system may be reduced.

In the embodiment of FIG. 2, a wireless link between the UE 201 and the RAN 202, a connection between the RAN 202 and the GW-U 102 and a connection between the GW-U 102 and the PDN 204 constitute a data path of the UE 201. However, the data path of the UE 201 is not limited in such a specific form. For example, the data path may be a connection or a tunnel for forwarding the data of the UE between the RAN and the GW-U or between the GW-U and other gateways, such as a GTP tunnel, a GRE connection, a service data stream and the like. The data path may be of bearer granularity or service data stream granularity. The data path may also be a data connection between a user plane gateway and the VPN of the PDN.

Figure 3:
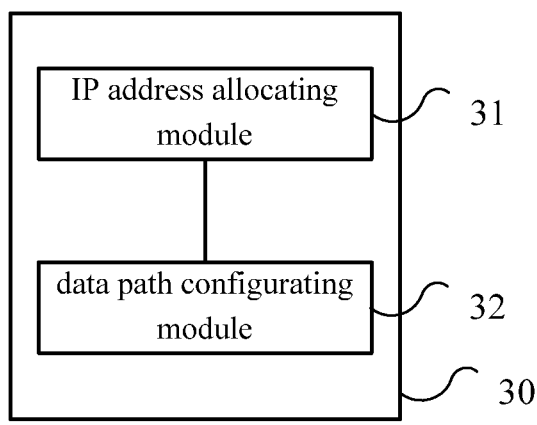
FIG. 3 is a schematic block diagram of control plane gateway device of an embodiment of the present invention.

FIG. 3 is a schematic block diagram of control plane gateway device of an embodiment of the present invention. The control plane gateway device 30 of FIG. 3 is an example of the control plane entity 101 of FIG. 1, and includes an IP address allocating module 31 and a data path configuring module 32.

The IP address allocating module 31 is configured to allocate an IP address to user equipment UE. The data path configuring module 32 is configured to generate configuration information of a data path according to the IP address allocated by the IP address allocating module 31. The data path configuring module 32 may also send the generated configuration information of the data path to user plane gateway device 40. Certainly, the configuration information may also be sent to the user plane gateway device 40 by other modules with a sending function. The above-mentioned data path is used for connecting the user plane gateway device 40 with an RAN, a PDN or other network elements, wherein the user plane gateway device 40 is located between the PDN and the RAN and is independent of the control plane gateway device 30.

The above-mentioned IP address allocating module 31 or data path configuring module 32 may be realized through a corresponding processor, circuit, receiver or transmitter.

The control plane gateway device (or called as a control plane entity, a gateway controller, a control node, a control gateway and the like) will be described in more detail below in combination with specific examples.

It should be noted that, in FIG. 3, the connection between the IP address allocating module 31 and the data path configuring module 32 may be a direct connection or an indirect connection through one or more other modules, which is not limited in the embodiment of the present invention.

Figure 4:
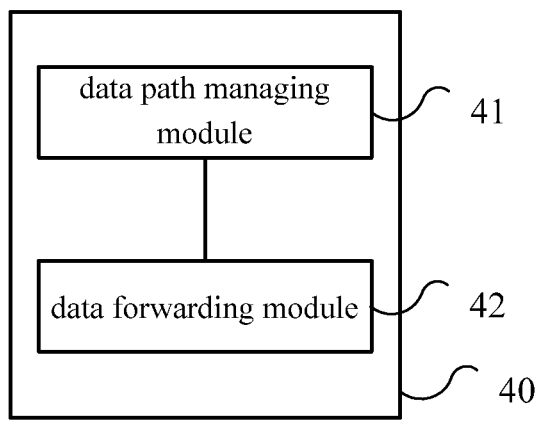
FIG. 4 is a schematic block diagram of user plane gateway device of an embodiment of the present invention.

FIG. 4 is a schematic block diagram of user plane gateway device of an embodiment of the present invention. The user plane gateway device 40 of FIG. 4 is an example of the user plane entity 102 of FIG. 1, and includes a data path managing module 41 and a data forwarding module 42.

The data path managing module 41 is connected with control plane gateway device (such as the control plane entity 101 shown in FIG. 1 or the control plane gateway device 30 shown in FIG. 3), and configured to receive configuration information of a data path from the control plane gateway device and manage the data path according to the configuration information.

The data forwarding module 42 is connected with the data path managing module 41 and configured to forward data on the data path managed by the data path managing module 41, for example, forward uplink and downlink data of user equipment UE.

The above-mentioned data path is used for connecting the user plane gateway device 40 with an RAN, a PDN or other gateways. In addition, the user plane gateway device 40 is located between the PDN and the RAN and is independent of the above-mentioned control plane gateway device.

It should be noted that, in FIG. 4, the connection between the data path managing module 41 and the data forwarding module 42 may be a direct connection or an indirect connection through one or more other modules, which is not limited in the embodiment of the present invention.

Exemplarily, the data path managing module 41 in FIG. 4 may be realized through a processor or a corresponding circuit, and the data forwarding module may be realized through a receiver or a transmitter.

Figure 5:
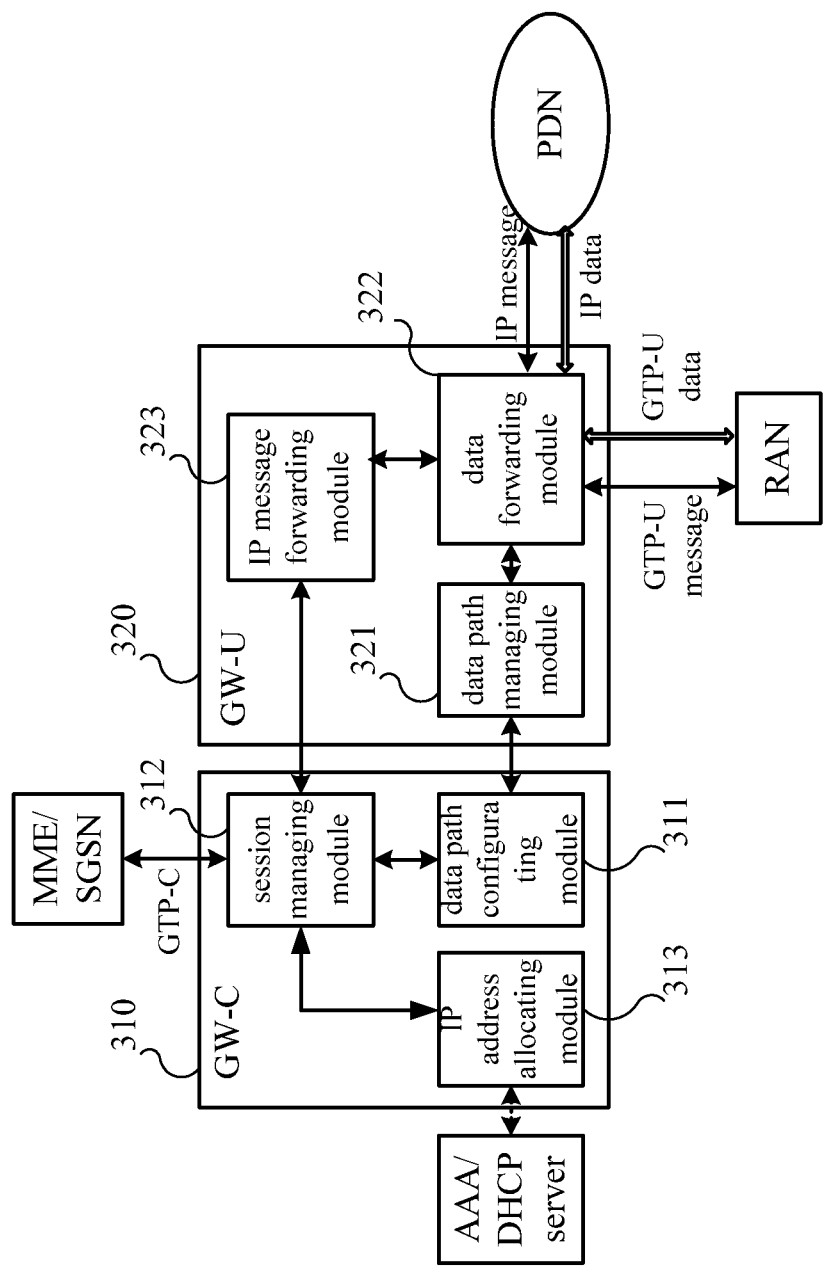
FIG. 5 is a schematic structural diagram of a gateway system of another embodiment of the present invention.

FIG. 5 is a schematic structural diagram of a gateway system of another embodiment of the present invention. The gateway system of FIG. 5 includes a GW-C 310 and a GW-U 320. For the purpose of briefness, only one GW-C and one GW-U are described in FIG. 5, but the number of each entity of the gateway system in the embodiment of the present invention is not limited.

As shown in FIG. 5, the GW-C 310 includes a data path configuring module 311, which is configured to generate configuration information of a data path for forwarding uplink and downlink data of UE. The data path configuring module 311 may also send the generated configuration information of the data path to the GW-U 320.

The GW-U 320 includes a data path managing module 321 and a data forwarding module 322. The data path managing module 321 is connected with the data path configuring module 311 of the GW-C 310, and configured to receive the above-mentioned configuration information from the data path configuring module 311 and manage the data path for forwarding the uplink and downlink data of the UE according to the above-mentioned configuration information. The management of the data path may include establishment, modification, update, deletion or the like of the data path.

The data forwarding module 322 is connected with the data path managing module 321 and configured to forward the uplink and downlink data of the UE on the data path managed by the data path managing module 321.

Optionally, as an embodiment, the configuration information generated by the data path configuring module 311 may include at least one of the following information: identification information of the GW-C 310, identification information of a peer network element of the GW-U 320 on the data path, data path information, association information of the data path and the like.

Optionally, as another embodiment, the above-mentioned identification information may include at least one of the following items: an IP address, an MAC (Media Access Control) address, a port number, a protocol type and the like.

Optionally, as another embodiment, the above-mentioned data path information may include at least one of the following items: a data path protocol, a data path identifier, PDN connection information, bearer information, QoS (Quality of Service) information, service data stream information and charging manner information.

Examples of the data path protocol include a GTPv1, an L2TP, GRE, an IPsec and the like. Examples of the data path identifier include a bearer identifier, a tunnel identifier of an L2TP protocol, a GRE key, a tunnel identifier and the like. Examples of the PDN connection information include a PDN connection identifier, an APN and the like. Examples of the bearer information include a bearer identifier, a dedicated bearer identifier and the like. Examples of the QoS information include a QCI (QoS Class Identifier), a maximum bandwidth, an assured bandwidth, an ARP (Allocation/Retention Priority), DSCP (Differentiated Services Code Point) information, and service data stream information (including one or more IP quintuple filters, and QoS information related to a service data stream). The QCI is generally used for indicating the information such as data transmission delay, a packet loss rate and the like of a bearer or the service data stream.

Optionally, as another embodiment, the above-mentioned peer network element may include at least one of the following items: an RAN network element, a VPN network element, an S-GW, a P-GW, a packet data gateway PDG, an SGSN for data forwarding and the like. For example, the peer network element may be an adjacent node of the GW-U on the data path.

Optionally, as another embodiment, the association information of the above-mentioned data path may include at least one of the following information: association information of the UE with the data path, association information of the service data stream of the UE with the data path, association information between a data path for connecting the PDN and a data path for connecting the RAN, association information between the data path for connecting the PDN and a data path for connecting other gateways, and association information between the data path for connecting the other gateways and the data path for connecting the RAN.

The association information of the data path is generally used for, when the GW-U receives a downlink data packet, forwarding the data packet to the associated data path. For example, the association information of the data path generally may use UE information. The UE information generally includes at least one of the following information: an IP address of the UE, an MAC address, and other information (such as an IMSI, an MSISDN, an IMEI or the like) for identifying the UE. For example, when the GW-U receives the downlink data packet, the GW-U may forward the data packet to the data path matched with the destination IP address of the data packet and used for forwarding the uplink and downlink data of the UE according to the destination IP address.

The association information of the data path may also be service data stream information, such as IP quintuple (a source IP address, a destination IP address, a source port number, a destination port number and a protocol type) of a data packet. Under such a condition, if one UE has multiple data paths, the GW-U may also forward the downlink data packet to the data path having the service data stream information matched with the IP quintuple of the data packet.

The association information of the data path may also be the association information between the data path for connecting the PDN and the data path for connecting the RAN. When the data path for connecting the PDN sends a downlink data packet to the GW-U, the GW-U may forward the downlink data packet to the corresponding data path connected to the RAN according to the association information. Whereas when the data path for connecting the RAN sends an uplink data packet to the GW-U, the GW-U may forward the downlink data packet to the corresponding data path connected to the PDN according to the association information. The association information of other forms may be constituted by those skilled in the art according to the examples of the above-mentioned association information, and these implementations fall into the scope of the embodiments of the present invention.

Optionally, as another embodiment, if one GW-C 310 needs to be configured with the data paths of a plurality of GW-Us 320, the data path configuring module 311 may also comprehensively consider the load condition of the plurality of GW-Us 320. For example, the data path configuring module 311 may acquire load information of the plurality of GW-Us 320 from of the plurality of GW-Us 320 or a network management network element, and send the configuration information of the data path to the GW-U 320 with lighter or the lightest load according to the load information of the plurality of GW-Us 320. Or, the data path configuring module 311 may generate the configuration information of the data path according to load weight information of the plurality of GW-Us 320, so that the loads of the plurality of GW-Us 320 are balanced. In this way, the load of the user plane entity is more balanced, and the efficiency of the system is improved.

Optionally, as another embodiment, as shown in FIG. 5, the GW-C 310 may further include a session managing module 312. The session managing module 312 is connected with the data path configuring module 311. The session managing module 312 is configured to process session signaling. The session signaling includes at least one of the following items: a GTP-C message (an S11, S4 or GnGp interface message) between the GW-C 310 and the mobility management network element MME/SGSN, a GTP-U message transmitted on an interface (an S1-U interface or an Iu interface) between the RAN (such as a GERAN, a UTRAN or an E-UTRAN) and the GW-U 320, and an IP message (including an authentication, authorization and accounting message, an L2TP message, a GRE protocol message and the like) between the GW-U 320 and the PDN. The GTP-C message includes an interaction message for establishing, modifying (updating) and deleting bearers or PDPs for the UE. These bearers or PDPs are used for forwarding data of a user plane of the UE between the GW-U and the RAN. Examples of the GTP-U message include, but not limited to, an echo message, an error indication message and the like.

Optionally, as another embodiment, as shown in FIG. 5, the GW-U 320 may further include an IP message forwarding module 323, which is connected with the session managing module 312 of the GW-C 310 and the data forwarding module 322 of the GW-U 320 and configured to forward the above-mentioned IP message between the PDN and the session managing module 312 through the data forwarding module 322. The IP message is a management message for managing an IP path between the GW-U 320 and a VPN gateway of the PDN by the GW-C 310, for example, may include L2TP, GRE and other IP path management messages. Optionally, the IP message forwarding module 323 and the data forwarding module 322 may be combined into a module, so that the IP message may be directly forwarded to the GW-C 310 or the PDN.

Optionally, as another embodiment, as shown in FIG. 5, the GW-C 310 may further include an IP address allocating module 313. The IP address allocating module 313 allocates the IP address to the UE. For example, the IP address allocating module 313 may be connected with the session managing module 312 of the GW-C 310, and is configured to allocate the IP address to the UE based on a request of the session managing module 312. The IP address allocating module 313 may send the allocated IP address to the data path configuring module 311 directly or through the session managing module 312, which is not limited in the embodiment of the present invention.

For example, when the UE initiates a connection (a bearer or a PDP) for establishing an access network, the session managing module 312 may request the IP address allocating module 313 to allocate the IP address to the UE. The IP address allocating module 313 may acquire an IP address resource (such as an IP pool) from the GW-U 320 or acquire the IP address resource from an internal configuration of the GW-C 310, select the IP address for the UE from the IP address resource and allocate the selected IP address to the UE. Or, the IP address allocating module 313 may acquire the IP address from a server (an AAA server or a DHCP server as shown in FIG. 5) outside the GW-C 310 and allocate the acquired IP address to the UE.

Figure 6:
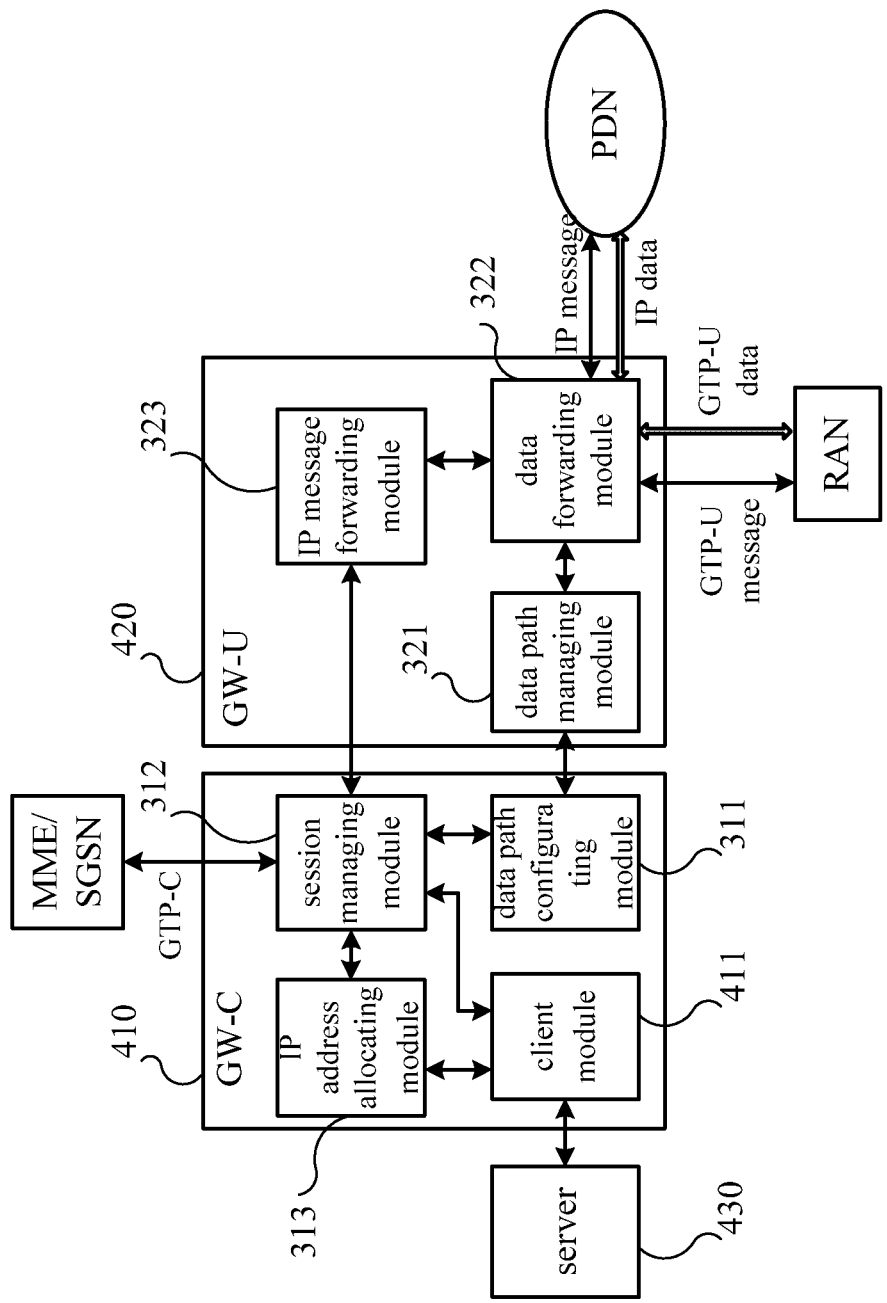
FIG. 6 is a schematic structural diagram of a gateway system of another embodiment of the present invention.

FIG. 6 is a schematic structural diagram of a gateway system of another embodiment of the present invention. The gateway system of FIG. 6 includes a GW-C 410 and a GW-U 420. For the purpose of briefness, only one GW-C and one GW-U are described in FIG. 6, but the number of each entity of the gateway system in the embodiment of the present invention is not limited.

Modules in the embodiment of FIG. 6 are indicated by the same reference signs as those in FIG. 5, so repeated description is appropriately omitted.

As shown in FIG. 6, the GW-C 410 may further include a client module 411. The client module 411 is connected with the session managing module 312 and a server 430 in a PDN, and configured to acquire a result of authenticating or authorizing UE by the server 430 when a data path is newly established by the UE. The server 430 in the above-mentioned PDN may be a Radius (Remote Authentication Dial In User Service) or Diameter server.

Optionally, the client module 411 may also acquire the IP address of a new bearer of the UE through interaction with the server 430, and the IP address is allocated to the IP address of the new bearer of the UE by the IP address allocating module. In addition, the client module 411 may also acquire peer network element information and data path information of a VPN through interaction with the server 430.

In this case, the UE may be accessed to the external PDN more securely.

Figure 7:
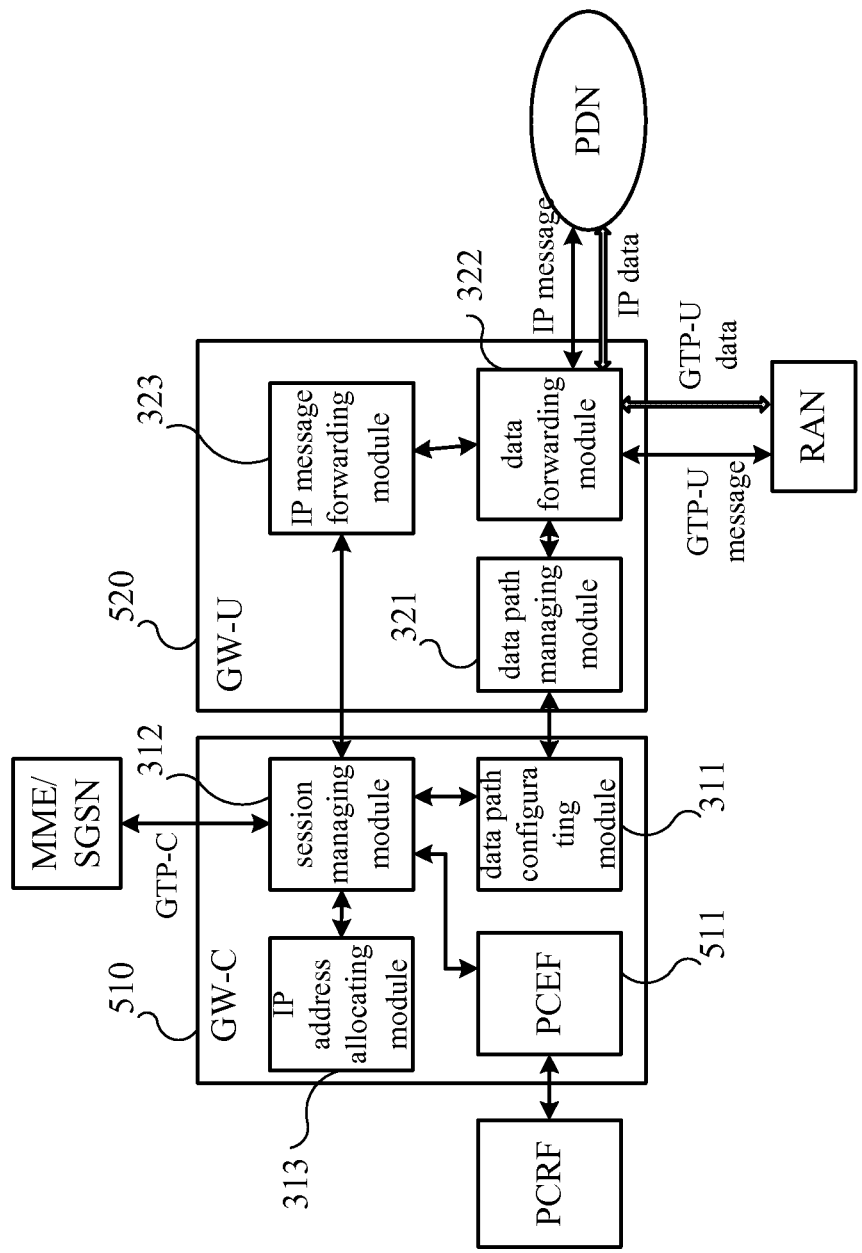
FIG. 7 is a schematic structural diagram of a gateway system of another embodiment of the present invention.

FIG. 7 is a schematic structural diagram of a gateway system of another embodiment of the present invention. The gateway system of FIG. 7 includes a GW-C 510 and a GW-U 520. For the purpose of briefness, only one GW-C and one GW-U are described in FIG. 7, but the number of each entity of the gateway system in the embodiment of the present invention is not limited.

Modules in the embodiment of FIG. 7 are indicated by the same reference signs as those in FIG. 5, so repeated description is appropriately omitted.

As shown in FIG. 7, the GW-C 510 further includes a PCEF (Policy and Charging Enforcement Function) module 511. The PCEF module 511 is connected with the data path configuring module 311 or the session managing module 312, and configured to acquire policy information from an internal configuration or a PCRF (Policy and Charging Rules Function) device outside the GW-C 510, acquire QoS information from the policy information, and send the QoS information to the data path configuring module 311 or send the QoS information to the data path configuring module 311 through the session managing module 312.

The data path configuring module 311 may receive the QoS information, and the data path information of the generated configuration information includes the QoS information. The data forwarding module 322 may control the quality of service of the uplink and downlink data according to the QoS information in the process of forwarding the uplink and downlink data of the UE.

In this case, QoS control of data transmission of the UE may be realized.

Figure 8:
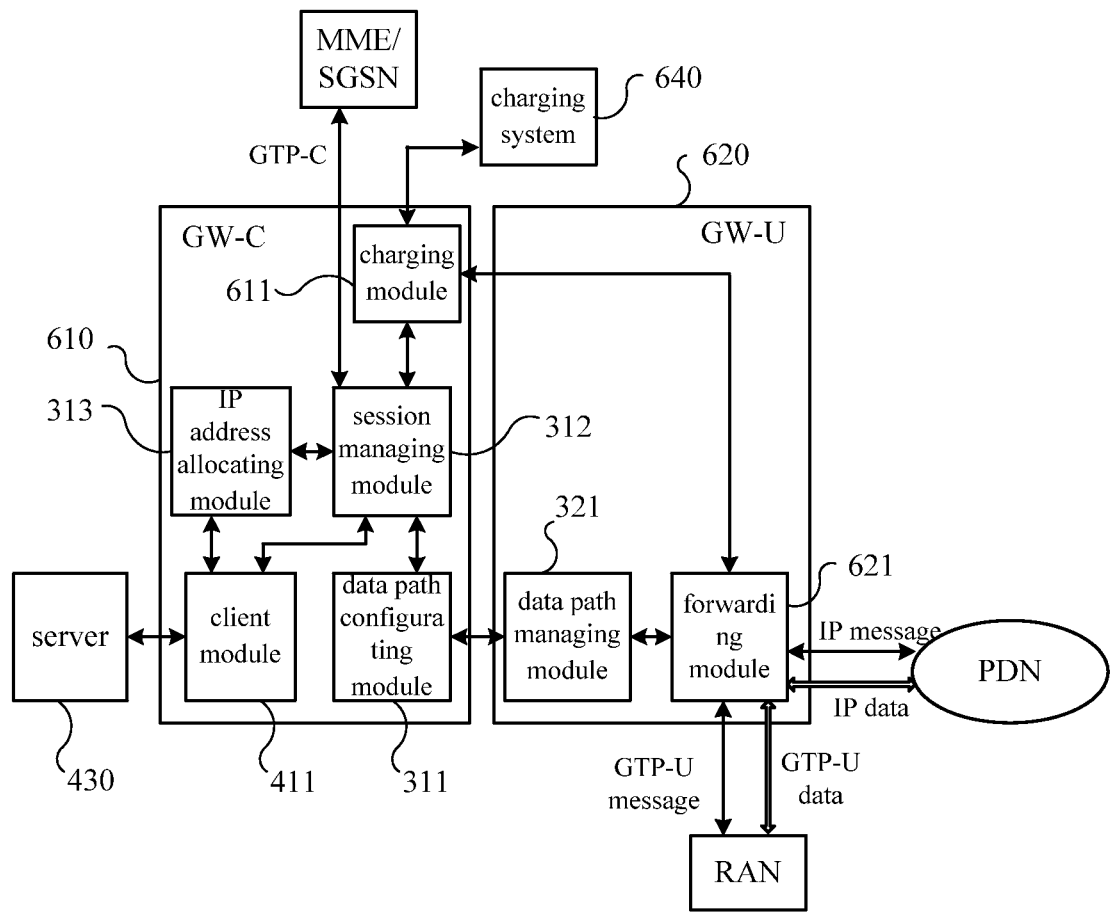
FIG. 8 is a schematic structural diagram of a gateway system of another embodiment of the present invention.

FIG. 8 is a schematic structural diagram of a gateway system of another embodiment of the present invention. The gateway system of FIG. 8 includes a GW-C 610 and a GW-U 620. For the purpose of briefness, only one GW-C and one GW-U are described in FIG. 8, but the number of each entity of the gateway system in the embodiment of the present invention is not limited.

Modules in the embodiment of FIG. 8 are indicated by the same reference signs as those in FIG. 6, so repeated description is appropriately omitted. In addition, in the GW-U 620 of FIG. 8, a forwarding module 621 simultaneously realizes an IP message forwarding function and a data forwarding function, which correspond to the combination of the data forwarding module 322 and the IP message forwarding module 323 in FIG. 6, but the forwarding module 621 may also be realized by two modules similarly, which is not limited in the embodiment of the present invention.

As shown in FIG. 8, the GW-C 610 further includes a charging module 611, which is connected with the forwarding module 621 (or the data forwarding module 322) of the GW-U 620 and a charging system 640 which is located outside the GW-C 610.

The forwarding module 621 (or the data forwarding module 322) may collect use information of a data path, such as data traffic of the data path, data traffic and time length of a service data stream and other information, and report the use information to the charging module 611. The charging module 611 may generate a charging data record according to the use information and report the generated charging data record to the charging system 640.

Generally, in the connection establishment process of the UE, the session managing module 312 informs the charging module 611 of connection establishment, and the charging module 611 informs the session managing module 312 of charging manner information (user's use information report manner: for example, report time interval, traffic interval, report granularity and the like).

When the GW-C 610 configures the data path to the GW-U 620, the data path information in the data path configuration information includes the charging manner information. The data path managing module 321 of the GW-U 620 configures the charging manner information in the data path. The forwarding module 621 (or the data forwarding module 322) reports the use information to the charging module 611 according to the charging manner.

In this case, the charging function of the gateway system may be realized.

Some examples of the gate systems of the embodiments of the present invention are described above. It should be noted that the above-mentioned examples do not intend to list all possible implementations of the gateway systems of the embodiments of the present invention. For example, the modules described in the embodiments of FIG. 3 to FIG. 8 may be recombined, combined or split, the gateway systems modified in this way fall into the scope of the embodiments of the present invention, as long as the gateway systems can realize the separation of a control plane function and a user plane function.

Figure 9:
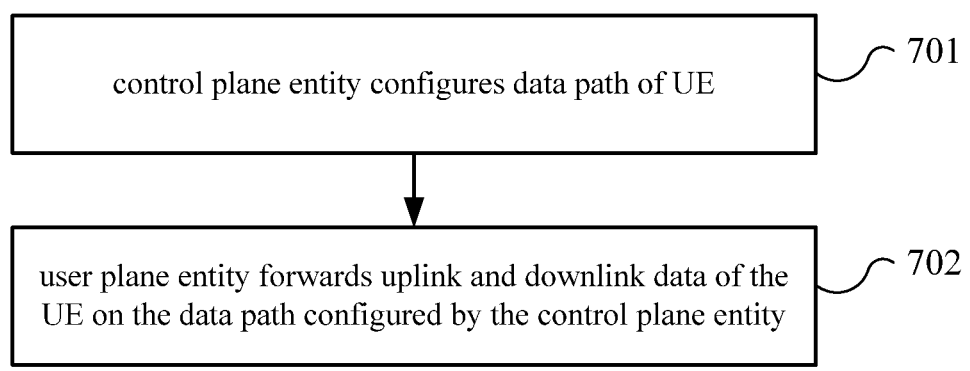
FIG. 9 is a flow diagram of a communication method of an embodiment of the present invention.

FIG. 9 is a flow diagram of a communication method of an embodiment of the present invention. The method of FIG.

9 may be executed by the gateway system 100 of FIG. 1. The gateway system 100 includes a control plane entity (GW-C) and one or more user plane entities (GW-U), the control plane entity is connected or integrated with a mobility management network element, and the user plane entities are located between a PDN and an RAN, are independent of the control plane entity and are connected with the control plane entity.

701, the control plane entity configures a data path for connecting the user plane entity with the RAN, the PDN or other network elements. For example, the control plane entity generates configuration information of the data path according to an IP address allocated to UE, and sends the configuration information of the data path to the user plane entity. Wherein, the other network elements herein may be other gateways except the control plane entity and the user plane entity.

702, the user plane entity forwards uplink and downlink data of the UE on the data path configured by the control plane entity. For example, the user plane entity receives the configuration information of the data path sent by the control plane entity, and forwards the context of the UE on the data path according to the configuration information.

The gateway system of the embodiment of the present invention is composed of the control plane entity and the user plane entity which are independent of each other, the control plane entity takes charge of the configuration of the data path, and the user plane entity takes charge of data forwarding on the data path, so that the number of the user plane entities may be independently changed to adapt to the change of network traffic without replacing all gateway entities, the network deployment is more convenient and the cost is lower. Meanwhile, because a control plane and user plane separated architecture is adopted, compared with the original gateway device, the design and realization of the device are simplified, and the processing performance is improved.

The method of FIG. 9 may be realized by the gateway system in FIG. 1 to FIG. 8, so repeated description is appropriately omitted.

Optionally, as an embodiment, in step 701, the control plane entity may generate the configuration information of the data path for forwarding the uplink and downlink data of the UE and send the configuration information to the user plane entity. In step 702, the user plane entity may receive the configuration information from the control plane entity, manage the data path for forwarding the uplink and downlink data of the UE according to the configuration information, and forward the uplink and downlink data of the UE on the managed data path.

Optionally, as another embodiment, the configuration information may include at least one of the following information: identification information of the user plane entity, identification information of a peer network element of the user plane entity on the data path, data path information, and association information of the data path.

Optionally, as another embodiment, the identification information may include at least one of the following items: an IP address, an MAC address, a port number and a protocol type.

Optionally, as another embodiment, the data path information may include at least one of the following items: a data path protocol, a data path identifier, PDN connection information, bearer information, QoS information, service data stream information and charging manner information.

Optionally, as another embodiment, the association information of the data path may include at least one of the following information: association information of the UE with the data path, association information of the service data stream of the UE with the data path, association information between a data path for connecting the PDN and a data path for connecting the RAN, association information between the data path for connecting the PDN and a data path for connecting other gateways, and association information between the data path for connecting the other gateways and the data path for connecting the RAN.

Optionally, as another embodiment, the peer network element may include at least one of the following items: an RAN network element, a VPN network element, an S-GW, a P-GW, a PDG, and an SGSN for data forwarding.

Optionally, as another embodiment, before step 701, the control plane entity may allocate the IP address to the UE when a connection establishment request of the UE is received.

For example, the control plane entity may acquire an IP address resource from the user plane entity or from the internal configuration of the control plane entity, select the IP address for the UE from the IP address resource and allocate the selected IP address to the UE. Or the control plane entity may acquire the IP address from a server outside the control plane entity and allocate the acquired IP address to the UE.

Optionally, as another embodiment, the control plane entity may send an access request message or an authorization and authentication request message to a server (such as a Radius or Diameter server) outside the control plane entity when the connection establishment request of the UE is received, and allocate the IP address to the UE according to an access response message or an authentication and authorization answer message returned by the server. At this moment, it may be ensured that the UE transmits data more securely.

Optionally, as another embodiment, before step 701, the control plane entity may receive UE-specific policy information sent by a PCRF device and acquire QoS information from the policy information, so that the generated configuration information of the data path includes the QoS information, and at this moment the quality of service of the data transmission of the UE may be better ensured.

Optionally, as another embodiment, the user plane entity may also collect use information of the data path and report the use information to the control plane entity. The control plane entity may generate a charging data record according to the use information and report the generated charging data record to a charging system. In this case, the charging function of the data transmission of the UE may be realized.

The communication method of the gateway system of the embodiment of the present invention will be described in more detail below in conjunction with specific examples.

Figure 10:
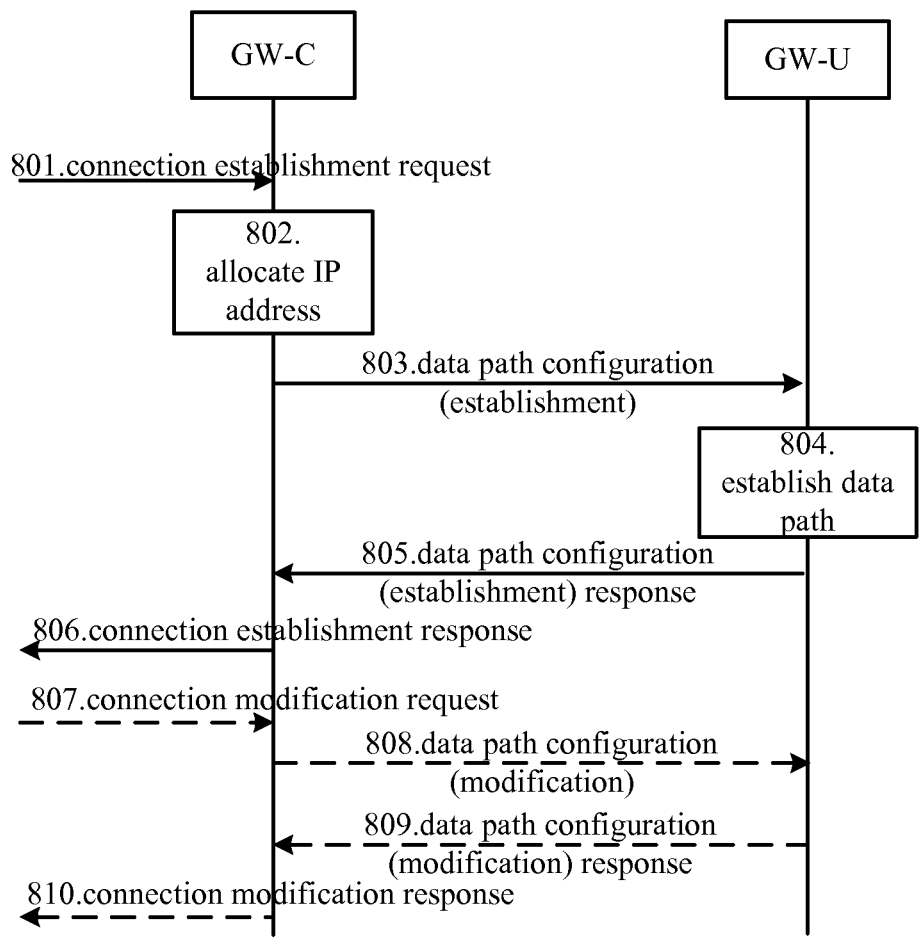
FIG. 10 is a schematic diagram of a flow of configuring a data path between a GW-C and a GW-U.

FIG. 10 is a schematic diagram of a flow of configuring a data path between a GW-C and a GW-U. The method of FIG. 10 may be realized by the gateway system in FIG. 1 to FIG. 8.

801, the GW-C receives a connection establishment message (for example, session establishment or PDP establishment and other messages). The message may include an IP address type (PDN type) of the UE, an access point name APN, peer network element information (optional) and data path identification information (optional).

802, the GW-C allocates an IP address to the UE. Optionally, the IP address allocated by the GW-C may be acquired from an address pool in the GW-C, or from an external DHCP server or AAA server. If the IP address type of the UE is an IPv4, the GW-C allocates an IPv4 address to the UE.

If the IP address type (PDN type) of the UE is an IPv6, the GW-C allocates an IPv6 address prefix to the UE. If the IP address type (PDN type) of the UE is an IPv4v6, the GW-C allocates both the IPv4 address and the IPv6 address prefix to the UE. Optionally, the IP address type (PDN type) of the APN may be configured on the GW-C, and allocation of the IPv4 and/or IPv6 address to the UE is determined according to the configured IP address type and the IP address type of the UE.

Optionally, if the requested APN is a VPN service, the GW-C needs to interact with a server (Radius/Diameter/DHCP server) in a VPN to complete an access authentication process of the VPN, and acquire peer VPN network element information (an IP address and a port number) and data path information (a data path protocol and a data path identifier).

803, the GW-C sends a data path configuration (establishment) message to the GW-U. Generally, the message carries configuration information of at least one data path. The configuration information of the data path includes local end network element (GW-U) information (optional), peer network element information (optional), data path information and data path association information (such as the IP address of the UE). Generally, the message carries the configuration information of at least one data path connected to an RAN.

Optionally, under a scenario that the requested connection is a VPN service, the message may also carry configuration information of at least one data path between the GW-U and the PDN, and the configuration information of the data path includes local end network element (GW-U) information, peer network element information, data path information and data path association information. The peer network element information includes VPN network element information. The data path information includes a protocol of a data path for connecting a VPN and a data path identifier (such as an L2TP tunnel identifier, a session identifier, a GRE key or the like).

804, the GW-U establishes a data path for transmitting data.

805, the GW-U returns a response message of data path configuration (establishment) to the GW-C. If the GW-C does not have the local end network element (GW-U) information in the data path configuration (establishment) message, the GW-U may carry the local end network element information in the response message.

806, the GW-C returns a connection establishment response message. The message includes the local end network element (GW-U) information and IP address information of the UE.

If the peer network element information is not included in the connection establishment request message, steps 807 to 810 may be further executed.

807, the GW-C receives a connection modification request message (for example, a bearer modification request or a PDP update request) carrying the peer network element information.

808, the GW-C sends a data path configuration (modification) request message including the peer network element information.

809, the GW-U updates the peer network element information in the configuration information of the established data path. The GW-U returns a data path configuration (modification) response message.

810, the GW-C returns a connection modification response message.

Optionally, before step 802, the GW-C may acquire an IP address resource from the GW-U and allocate the IP address to the UE from the acquired IP address resource.

Optionally, before step 803, the GW-C may acquire the local end network element (GW-U) information from the GW-U or local configuration and send the local end network element information to the GW-U through the data path configuration message.

Optionally, in step 804, the GW-U may allocate a data path identifier per se and send the data path identifier to the GW-C in step 805.

Optionally, before step 803, the GW-C may acquire a data path identifier resource from the GW-U or local configuration, allocate a data path identifier from the data path identifier resource and send the data path identifier to the GW-U through the data path configuration (establishment) message.

Optionally, before step 803, the GW-C may acquire load information of a plurality of GW-Us from the plurality of GW-Us or network management network elements, and select the GW-U with relatively light load for configuring the data path according to the load information of the plurality of GW-Us. Or, the GW-C selects a GW-U configuration data path according to load weight information of the plurality of GW-Us, so that the loads between the plurality of GW-Us are balanced.

The gateway system of the embodiment of the present invention is composed of the control plane entity and the user plane entity which are independent of each other, the control plane entity takes charge of the configuration of the data path, and the user plane entity takes charge of data forwarding on the data path, so that the number of the user plane entities may be independently changed to adapt to the change of network traffic without replacing all gateway entities, the network deployment is more convenient and the cost is lower. Meanwhile, because a control plane and user plane separated architecture is adopted, compared with the original gateway device, the design and realization of the device are simplified, and the processing performance is improved.

For example, when the average traffic per user of the mobile wideband in the future is greatly increased, the traffic may be shared only by simply increasing the user plane entity without excessively reforming the control plane entity, so that the network deployment is simpler and more reliable.

Figure 11:
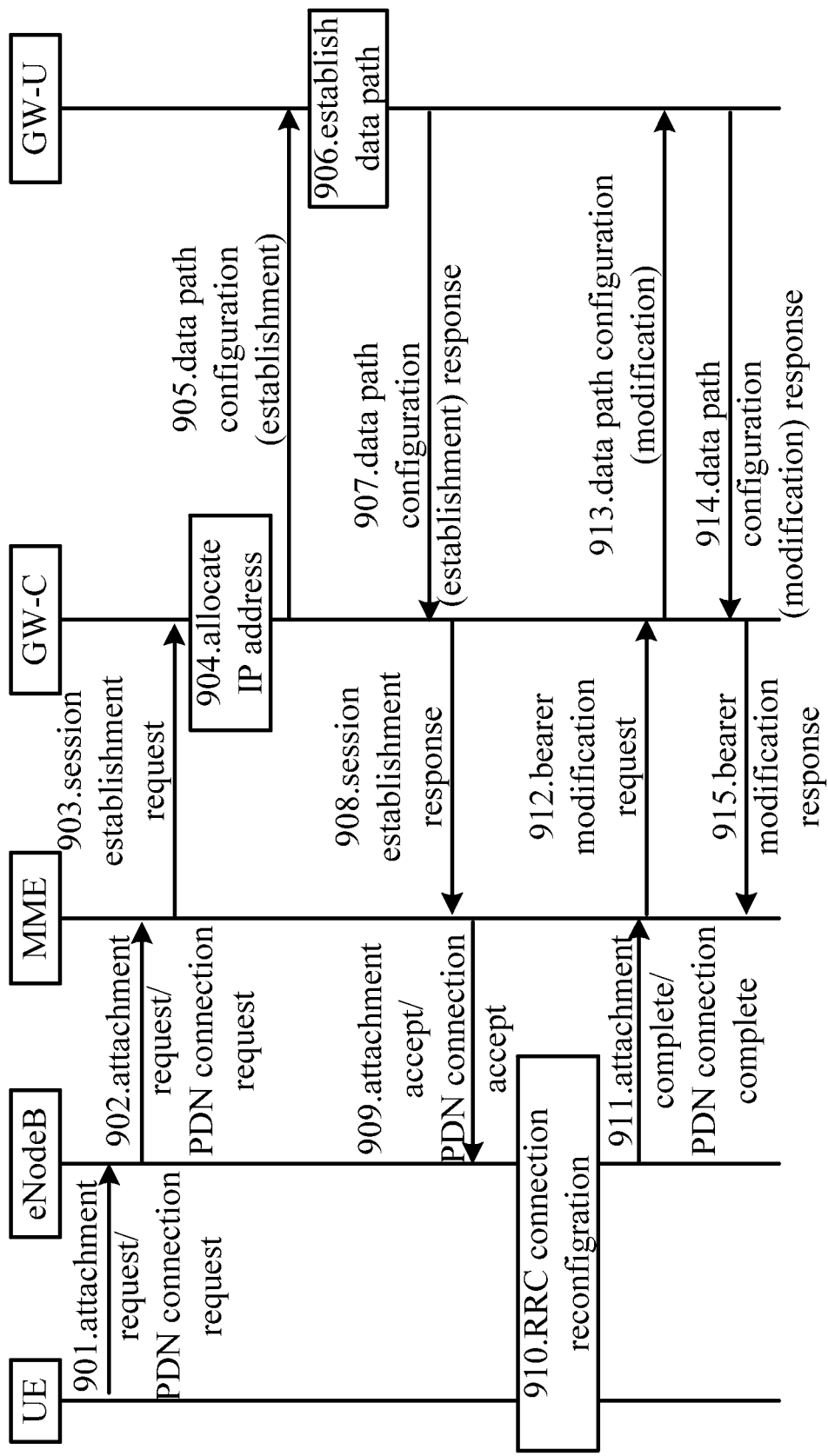
FIG. 11 is a schematic diagram of a communication flow between a gateway system of an embodiment of the present invention and other network elements under an SAE network architecture.

Under an SAE network architecture, the process of establishing a bearer for the UE includes an attachment flow and a UE requesting PDN connection flow. FIG. 11 is a schematic diagram of a communication flow between a gateway system of an embodiment of the present invention and other network elements under the SAE network architecture.

The flow of FIG. 11 includes a union of an attachment flow and a UE requiring PDN connection flow. There is "attachment" in the names of messages corresponding to the attachment flow in steps 901, 902, 909 and 911, and there is "PDN connection" in the names of messages corresponding to the UE requiring PDN connection flow.

901, UE sends an attachment request or PDN connection request message to an eNodeB, wherein the message includes PDN type information (for example, an IPv4, an IPv6 or an IPv4v6) and an APN (optional).

902, the eNodeB sends the attachment request or PDN connection request message of the UE to an MME.

903, the MME sends a session establishment request message. The message may include an IP address type (PDN type) of the UE and an access point name (APN).

904, a GW-C allocates an IP address to the UE.

905, the GW-C sends a data path configuration (establishment) message to a GW-U. The message carries configuration information of at least one data path, and the configuration information of the data path includes local end network element (GW-U) information (optional), data path information and data path association information. Generally, the message carries the configuration information of at least one data path connected to the eNodeB.

906, the GW-U establishes a data path for transmitting data.

907, the GW-U returns a response message of data path configuration (establishment) to the GW-C.

908, the GW-C returns a session establishment response message. The message includes local end network element (GW-U) information (IP address), data path identification information (TEID) of a local end network element and IP address information of the UE.

909, the MME sends an attachment accept message or a PDN connection accept message to the eNodeB.

910, the eNodeB and the UE perform a radio resource control connection reconfiguration process.

911, the eNodeB sends an attachment complete message or a PDN connection complete message to the MME. The message includes peer network element information (IP address) of the eNodeB and peer data path identification information (TEID) of the eNodeB.

912, the GW-C receives a bearer modification request message carrying peer network element information.

913, the GW-C sends a data path configuration (modification) request message including peer network element information and peer data path identification information.

914, the GW-U updates the peer network element information and peer data path identification information in the configuration information of the established data path. The GW-U returns a data path configuration (establishment) response message.

915, the GW-C returns a bearer modification response message.

Figure 12:
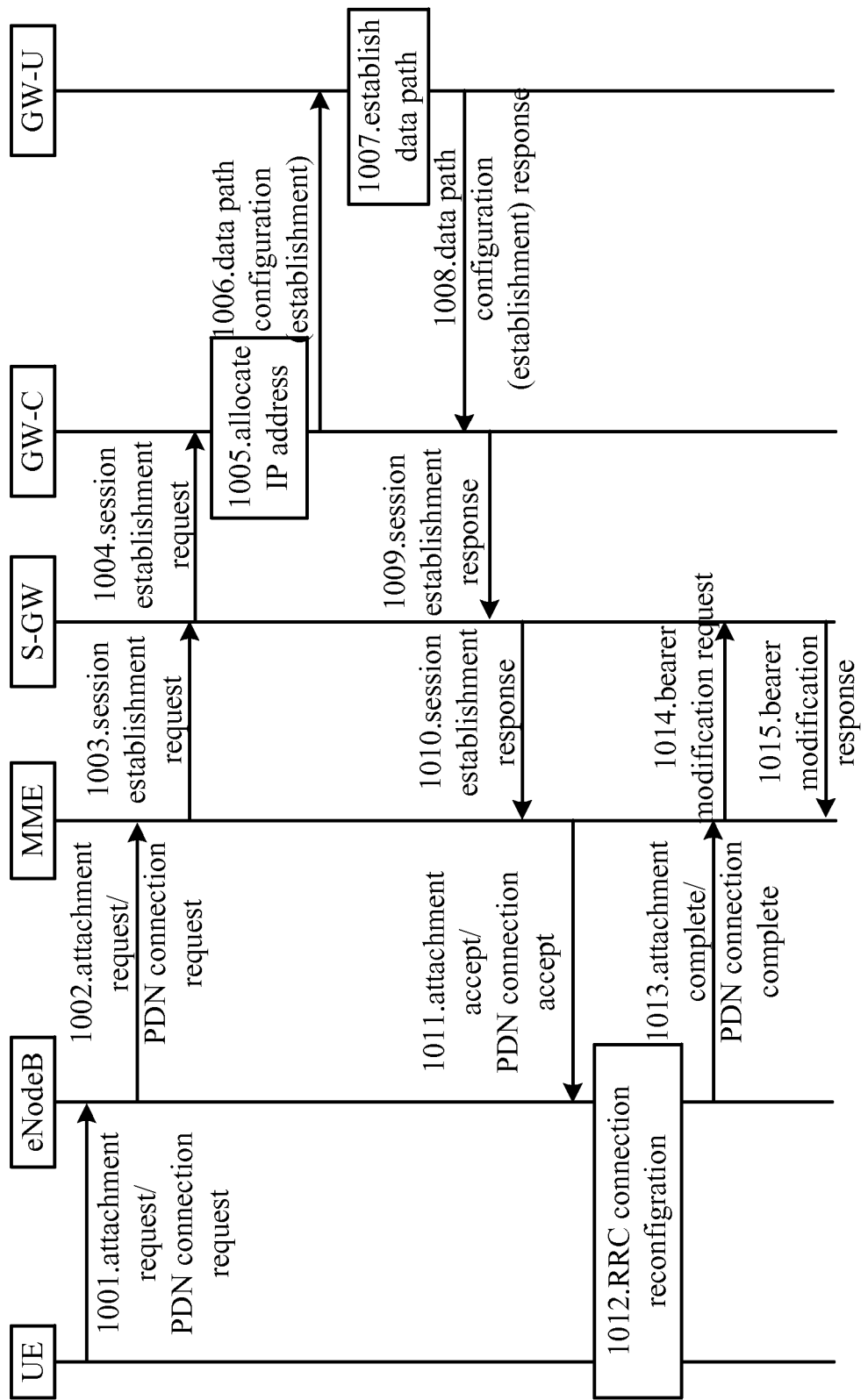
FIG. 12 is a schematic diagram of a communication flow between a gateway system of an embodiment of the present invention and other network elements.

In another aspect, under a roaming scenario or an S-GW and P-GW separated scenario, if the GW-C and the GW-U are taken as P-GWs, the MME is connected with the GW-C through an S-GW. The process for establishing a bearer for UE includes an attachment flow and a UE requesting PDN connection flow. FIG. 12 is a schematic diagram of a communication flow between a gateway system of an embodiment of the present invention and other network elements.

1001, UE sends an attachment request or PDN connection request message to an eNodeB, wherein the message includes PDN type information (for example, an IPv4, an IPv6 or an IPv4v6) and an APN (optional).

1002, the eNodeB sends the attachment request or PDN connection request message of the UE to an MME.

1003, the MME sends a session establishment request message. The message may include an IP address type (PDN type) of the UE and an access point name APN.

1004, the S-GW sends the session establishment request message to the GW-C. The message may include IP address type (PDN type) of the UE, the access point name APN, peer network element information of the S-GW and a peer data path identifier (TEID) of the S-GW.

1005, the GW-C allocates an IP address to the UE.

1006, the GW-C sends a data path configuration (establishment) message to the GW-U. The message carries configuration information of at least one data path, and the configuration information of the data path includes local end network element (GW-U) information (optional), peer network element information (S-GW), data path information (including a peer data path identifier of the S-GW) and data path association information. Generally, the message carries the configuration information of at least one data path connected to the eNodeB.

1007, the GW-U establishes a data path for transmitting data.

1008, the GW-U returns a response message of data path configuration (establishment) to the GW-C.

1009, the GW-C sends a session establishment response message. The message includes local end network element (GW-U) information, data path identification information (TEID) of a local end network element and IP address information of the UE.

1010, the S-GW sends the session establishment response message. The message includes the address of the S-GW, the TEID and the IP address information of the UE.

1011, the MME sends an attachment accept message or a PDN connection accept message to the eNodeB.

1012, the eNodeB and the UE perform a radio resource control connection reconfiguration process.

1013, the eNodeB sends an attachment complete message or a PDN connection complete message to the MME. The message includes the IP address and the TEID of the eNodeB.

1014, the MME sends a bearer modification request message carrying the IP address of the eNodeB and the TEID of the eNodeB.

1015, the S-GW returns a bearer modification response message.

Figure 13:
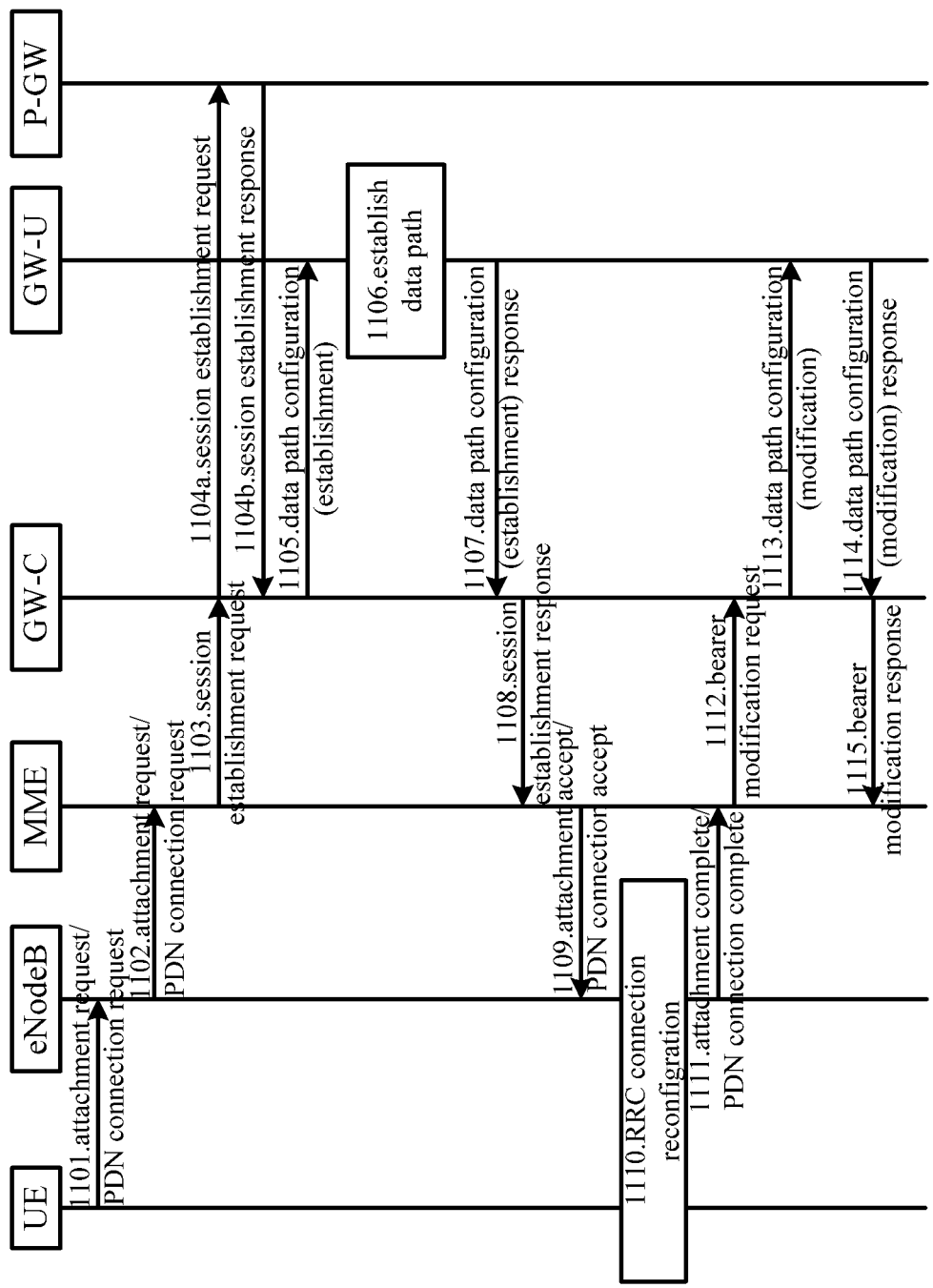
FIG. 13 is a schematic diagram of a communication flow between a gateway system of another embodiment of the present invention and other network elements.

In another aspect, under a roaming scenario or an S-GW and P-GW separated scenario, if the GW-C and the GW-U are taken as S-GWs, the GW-C and the GW-U also need to be connected with a P-GW. The process for establishing a bearer for UE includes an attachment flow and a UE requesting PDN connection flow. FIG. 13 is a schematic diagram of a communication flow between a gateway system of an embodiment of the present invention and other network elements.

1101, UE sends an attachment request or PDN connection request message to an eNodeB, wherein the message includes PDN type information (for example, an IPv4, an IPv6 or an IPv4v6) and an APN (optional).

1102, the eNodeB sends the attachment request or PDN connection request message of the UE to an MME.

1103, the MME sends a session establishment request message. The message may include an IP address type (PDN type) of the UE, an access point name (APN) and information (IMSI or MSISDN) of the UE.

1104*a*, the GW-C allocates local end network element information (IP address of the GW-U) and a data path identifier (TEID) of a local end network element. The GW-C sends the session establishment request message to the P-GW, wherein the message carries the local end network element information and the data path identifier of the local end network element.

1104*b*, the P-GW sends a session establishment response message to the GW-C, wherein the message carries peer network element information (address of the P-GW), a data path identifier of the peer network element (TEID of the P-GW) and the IP address of the UE.

1105, the GW-C sends a data path configuration (establishment) message to the GW-U. The message carries configuration information of at least two data paths. One data path is connected to the eNodeB, and the other data path is connected to the P-GW. The configuration information of the data path connected to the eNodeB includes local end network element (GW-U) information (optional), data path information and data path association information (for example, information of the UE). The configuration information of the data path connected to the P-GW includes local end network element (GW-U) (optional), peer network element information, data path information (including TEIDs of the local end network element and the peer network element) and data path association information (for example, information of the UE).

1106, the GW-U establishes a data path for transmitting data.

1107, the GW-U returns a response message of data path configuration (establishment) to the GW-C.

1108, the GW-C returns a session establishment response message. The message includes local end network element (GW-U) information (IP address), data path identification information (TEID) of the local end network element and IP address information of the UE.

1109, the MME sends an attachment accept message or a PDN connection accept message to the eNodeB.

1110, the eNodeB and the UE perform a radio resource control connection reconfiguration process.

1111, the eNodeB sends an attachment complete message or a PDN connection complete message to the MME. The message includes the peer network element information (IP address) of the eNodeB and peer data path identification information (TEID) of the eNodeB.

1112, the GW-C receives a bearer modification request message carrying the peer network element information and the peer data path identification information.

1113, the GW-C sends a message of configuring (modifying) the data path connected eNodeB, wherein the message includes the peer network element information and the peer data path identification information.

1114, the GW-U updates the peer network element information and peer data path identification information in the configuration information of the established data path. The GW-U returns a data path configuration (modification) response message.

1115, the GW-C returns a bearer modification response message.

Figure 14:
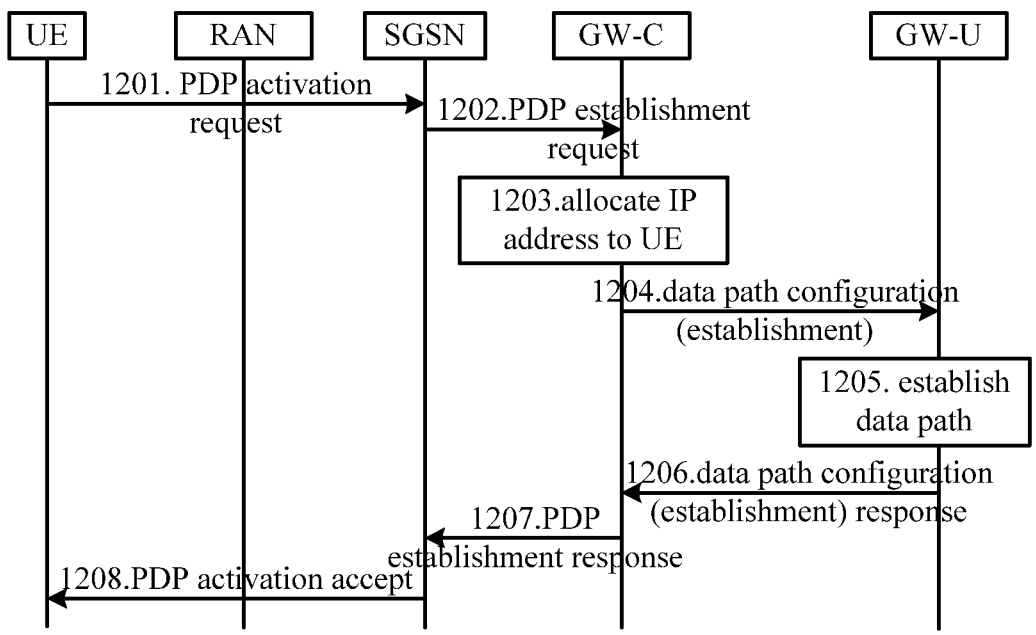
FIG. 14 is a schematic diagram of a flow that a gateway system of another embodiment of the present invention activates a PDP for UE.

FIG. 14 is a schematic diagram of a flow that a gateway system of another embodiment of the present invention activates a PDP for UE. The embodiment of FIG. 14 is applied to a GPRS network architecture.

1201, the UE (mobile station MS) sends a PDP activation request message to an SGSN, wherein the message includes PDN type information (for example, an IPv4, an IPv6 or an IPv4v6) and an APN (optional).

1202, the SGSN sends a PDP establishment request message. The message may include IP address type (PDN type) of the UE, the access point name APN, and peer network element information (IP address of a user plane) and peer data path identifier (TEID of the user plane) of the SGSN.

1203, a GW-C allocates an IP address to the UE.

1204, the GW-C sends a data path configuration (establishment) message to a GW-U. The message carries configuration information of at least one data path, and the configuration information of the data path includes local end network element (GW-U) information (optional), data path information (peer network element information and peer data path identifier of the SGSN) and data path association information (IP address of the UE). Generally, the message carries the configuration information of at least one data path connected to the eNodeB.

1205, the GW-U establishes a data path for transmitting data.

1206, the GW-U sends a response message of data path configuration (establishment) to the GW-C.

1207, the GW-C sends a PDP establishment response message to the SGSN. The message includes local end network element (GW-U) information (IP address), data path identification information (TEID of the GW-U) of a local end network element and IP address information of the UE.

1208, the SGSN sends a PDP activation accept message to the UE (MS).

Figure 15:
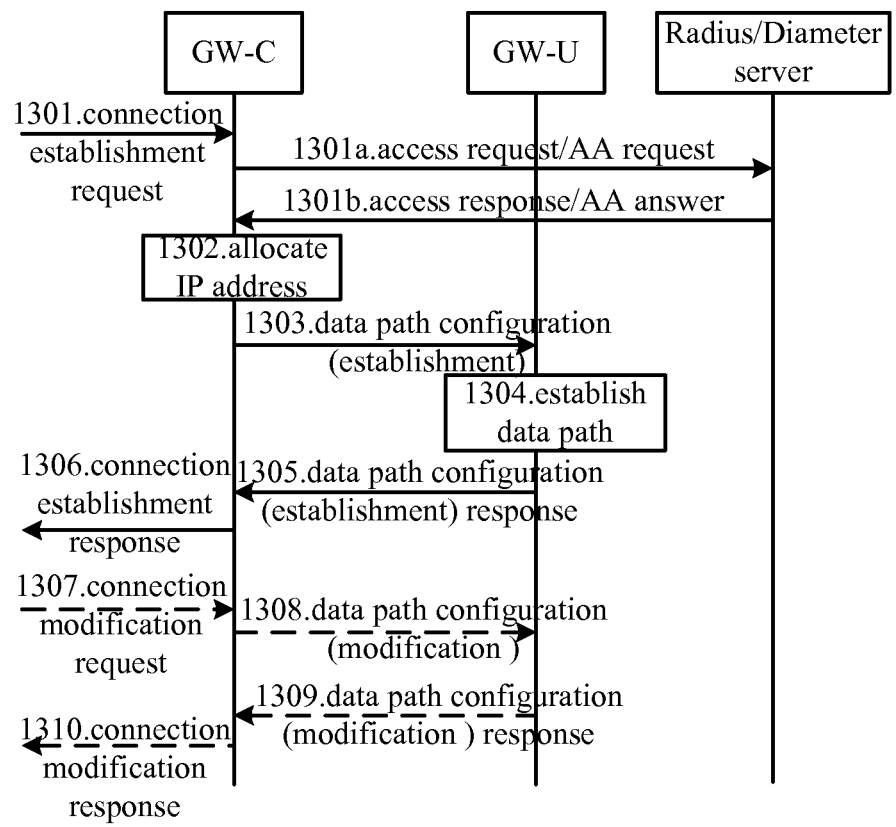
FIG. 15 is a schematic diagram of an interaction flow between a gateway system of another embodiment of the present invention and a Radius or Diameter server.

FIG. 15 is a schematic diagram of an interaction flow between a gateway system of another embodiment of the present invention and a Radius or Diameter server. In the gateway system of FIG. 15, a GW-C is provided with a client module, for example, the client module 411 of FIG. 6.

1301, the GW-C receives a message for establishing a connection (for example, a message for establishing a session, establishing a PDP and the like). The message may include IP address type (PDN type) of UE, an access point name APN, authentication information (for example, a user name, a password and the like) of the UE, peer network element information (optional) and data path identification information (optional).

1301a, the GW-C acquires the domain name or address of a corresponding Radius or Diameter server according to the configuration of the APN, and sends an access request or authorization and authentication (AA) request message to the Radius or Diameter server. The message includes requested IP address type and authentication information of the UE.

1301b, the Radius or Diameter server returns an access response message or an authorization and authentication (AA) answer message. The message carries an IPv4 address and/or an IPv6 prefix allocated to the UE.

1302, the GW-C allocates the IP address acquired in 1b to the UE. If the IP address type of the UE is an IPv4, the GW-C allocates the IPv4 address to UE. If the IP address type (PDN type) of the UE is an IPv6, the GW-C allocates the IPv6 address prefix to the UE. If the IP address type (PDN type) of the UE is an IPv4v6, the GW-C allocates both the IPv4 address and the IPv6 address prefix to the UE. Further, the IP address type (PDN type) of the APN may be configured on the GW-C, and allocation of the IPv4 and/or IPv6 address to the UE is determined according to the configured IP address type and the IP address type of the UE.

1303, the GW-C sends a data path configuration (establishment) message to a GW-U. Generally, the message carries configuration information of at least one data path, and the configuration information of the data path includes local end network element (GW-U) information (optional), peer network element information (optional), data path information and data path association information (IP address of the UE). Generally, the message carries the configuration information of at least one data path connected to an RAN.

Optionally, under a scenario that the requested connection is a VPN service, the message may also carry configuration information of at least one data path between the GW-U and a PDN, wherein the configuration information of the data path includes local end network element (GW-U) information, peer network element information, data path information and data path association information. The peer network element information includes VPN network element information. The data path information includes a protocol of a data path for connecting the VPN and a data path identifier (such as an L2TP tunnel identifier, a session identifier, a GRE key and the like).

1304, the GW-U establishes a data path for transmitting data.

1305, the GW-U returns a response message of data path configuration (establishment) to the GW-C. If the GW-C does not have the local end network element (GW-U) information in the data path configuration (establishment) message, the GW-U may carry the local end network element information in the response message.

1306, the GW-C returns a connection establishment response message. The message includes the local end network element (GW-U) information and IP address information of the UE.

If the peer network element information is not included in the connection establishment request message, steps 1307 to 1310 may be further executed.

1307, the GW-C receives a connection modification request message (for example, a bearer modification request or a PDP update request) carrying peer network element information.

1308, the GW-C sends a data path configuration (modification) request message including peer network element information.

1309, the GW-U updates the peer network element information in the configuration information of the established data path. The GW-U returns a data path configuration (modification) response message.

1310, the GW-C returns a connection modification response message.

In this case, the UE may transmit data more securely.

Figure 16:
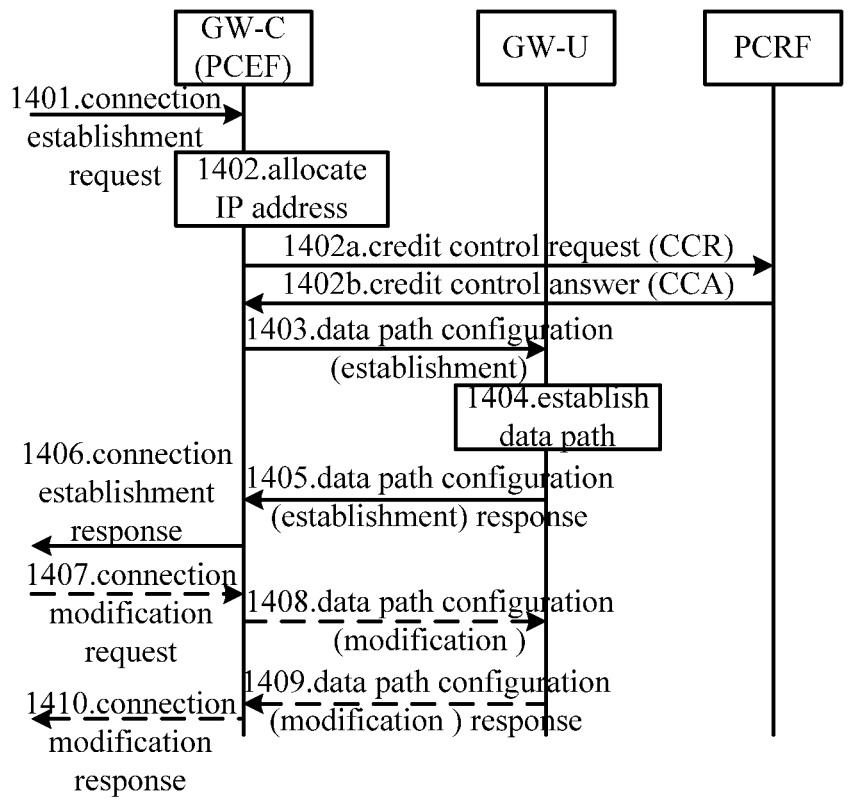
FIG. 16 is a schematic diagram of a policy control flow of a gateway system of another embodiment of the present invention.

FIG. 16 is a schematic diagram of a policy control flow of a gateway system of another embodiment of the present invention. The embodiment of FIG. 16 is applied to a process of initial connection establishment. A GW-C in the gateway system of FIG. 16 may include a PCEF module, such as the PCEF module 511 shown in FIG. 7.

1401, the GW-C receives a message for establishing a connection (for example, a message for establishing a session, establishing a PDP and the like). The message may include IP address type (PDN type) of UE, an access point name APN, peer network element information (optional) and data path identification information (optional).

1402, the GW-C allocates the acquired IP address to the UE. If the IP address type of the UE is an IPv4, the GW-C allocates an IPv4 address to the UE. If the IP address type (PDN type) of the UE is an IPv6, the GW-C allocates an IPv6 address prefix to the UE. If the IP address type (PDN type) of the UE is an IPv4v6, the GW-C allocates both the IPv4 address and the IPv6 address prefix to the UE. Optionally, the IP address type (PDN type) of the APN may be configured on the GW-C, and allocation of the IPv4 and/or IPv6 address to the UE is determined according to the configured IP address type and the IP address type of the UE.

1402*a*, the GW-C sends a credit control request (CCR) message to a PCRF, wherein the message includes IP address of the UE, a PDN identifier (APN) and service data stream information (optional).

1402*b*, the PCRF makes a policy according to policy signing of the UE to obtain policy information, and sends the policy information to the GW-C. The GW-C acquires service data stream information and QoS information (including bandwidth, priority, quality of service class identifier (QCI) and other information) from the policy information.

1403, the GW-C sends a data path configuration (establishment) message to a GW-U. Generally, the message carries configuration information of at least one data path, and the configuration information of the data path includes local end network element (GW-U) information (optional), peer network element information (optional), data path information (including the service data stream information and QoS information acquired from the policy information) and data path association information (IP address of the UE). Generally, the message carries the configuration information of at least one data path connected to an RAN.

1404, the GW-U establishes a data path for transmitting data. The GW-U performs QoS control on a service data stream in the data path according to the service data stream information and QoS information in the data path information.

1405, the GW-U returns a response message of data path configuration (establishment) to the GW-C. If the GW-C does not have local end network element (GW-U) information in the data path configuration (establishment) message, the GW-U may carry the local end network element information in the response message.

1406, the GW-C returns a connection establishment response message. The message includes the local end network element (GW-U) information and IP address information of the UE.

If the peer network element information is not included in the connection establishment request message, steps 1407 to 1410 may be further executed.

1407, the GW-C receives a connection modification request message (for example, a bearer modification request or a PDP update request) carrying the peer network element information.

1408, the GW-C sends a data path configuration (modification) request message including the peer network element information.

1409, the GW-U updates the peer network element information in the configuration information of the established data path. The GW-U returns a data path configuration (modification) response message.

1410, the GW-C returns a connection modification response message.

In this case, the quality of service of data transmission of the UE may be ensured according to the policy.

Figure 17:
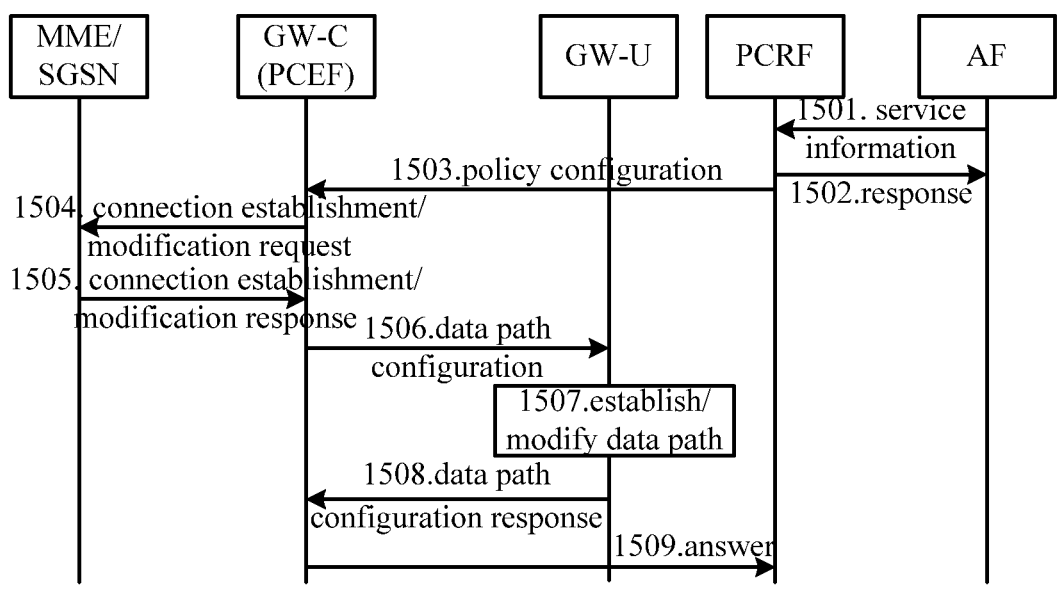
FIG. 17 is a schematic diagram of a policy control flow of a gateway system of another embodiment of the present invention.

FIG. 17 is a schematic diagram of a policy control flow of a gateway system of another embodiment of the present invention. In the embodiment of FIG. 17, an application function (AF) initiates a service. At this moment, a flow that a PCRF configures policy information to a GW-C (PCEF) is triggered. The GW-C in the gateway system of FIG. 17 may include a PCEF module, such as the PCEF module 511 shown in FIG. 7.

1501, the application function (AF) sends service information to the PCRF. The service information includes service data stream information, quality of service information (bandwidth, time delay and the like) required by the service and an identifier (IP address, PDN identifier, IMSI and the like) of UE.

1502, the PCRF returns a response, makes a policy according to the service information and policy signing information of the UE, and generates policy information of the service.

1503, the PCRF allocates the policy information of the service to the GW-C (PCEF).

1504, the PCEF determines to establish or modify a connection according to the QoS information in the policy information of the service. If the QCI is the same as the existing connection, the existing connection is modified. If the QCI is different from the existing connection, a new connection is established. The PCEF sends a connection establishment or modification request message to an MME/SGSN. The message carries the QoS information, local end network element information and data path information.

1505, the MME/SGSN interacts with an RAN, establishes or modifies the connection, and sends a connection establishment or modification response message. If a data path is to be established, the response message carries peer network element information and data path information.

1506, the GW-C sends a data path configuration message to a GW-U. If a new connection is to be established, the message includes local end network element (GW-U) of the newly added data path, peer network element information, data path information (including the service data stream information and QoS information acquired from the policy information) and data path association information (IP address of the UE). If the existing connection is to be modified, the message includes association information of the existing data path and data path information (including the identifier and QoS information of the data path).

1507, the GW-U newly establishes or modifies a data path, and controls a service data stream in the data path according to the configured QoS information.

1508, the GW-U sends a data path configuration response to the GW-C.

1509, the GW-C sends an answer message to the PCRF.

The PCRF will inform the AF that a transmission resource is already established later.

In this case, the quality of service of data transmission of the UE may be ensured according to the policy.

The embodiments of the present invention may solve the bottleneck problem that a gateway processes interface signaling, and separate the interface signaling processing function and the user plane data forwarding function of the gateway. For example, the interface signaling processing function may be put on a general computing platform to form a gateway control node. The user plane data forwarding function may be put on a dedicated router platform to form a gateway forwarding node. Through a manner of separating the gateway control node and the gateway forwarding node, the design of a hardware platform may be simplified, and the cost of the hardware platform may be reduced, thus being beneficial to accelerating the deployment of a mobile packet data network.

Those of ordinary skill in the art may realize that the units and algorithmic steps of the examples described in conjunction with the embodiments of the present invention may be realized by electronic hardware (such as a processor, a receiver, a transmitter, a memory, a bus system and the like) or a combination of computer software and electronic hardware. Whether these functions are executed in a hardware or software mode depends on the specific applications and design constraint conditions of the technical solution. For each specific application, professionals may implement the described functions by different methods, but this implementation shall not be considered as being beyond the scope of the present invention.

Those skilled in the art to which the present invention pertains may clearly understand that, for the purpose of better convenience and briefness in description, for the specific working processes of the above-described systems, devices and units, reference could be made to the corresponding processes in the embodiments of the aforementioned methods, and repeated description is not given here.

In the several embodiments provided in the present application, it shall be understood that the disclosed systems, devices and methods may be realized in other manners. For example, the embodiments of the above-described devices are only exemplary, for example, the division of the units is only a logic function division, other division manners may be adopted in practice, e.g., a plurality of units or components may be combined or integrated in another system, or some characteristics may be omitted or not executed. From another point of view, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments may be fulfilled by selecting part of or all of the units according to actual needs.

In addition, in various embodiments of the present invention, the functional units may be integrated in one processing unit, or the units may separately and physically exist, or two or more units may be integrated in one unit.

When the functions are realized in the form of software functional units and sold or used as independent products, the functions may be stored in a computer-readable storage medium. Based on such an understanding, the technical solutions of the present invention substantially, or the part of the present invention making contribution to the prior art, or part of the technical solutions may be embodied in the form of a software product, and the computer software product is stored in a storage medium, which includes a plurality of instructions enabling computer device (which may be a personal computer, a server, network device or the like) to execute all of or part of the steps in the methods of the embodiments of the present invention. The aforementioned storage medium includes: various media capable of storing program codes, such as a U disk, a mobile hard disk, a read-only memory (ROM), a random access memory (RAM), a disk, an optical disk or the like.

The foregoing description is the specific implementations of the present invention only, but the protection scope of the present invention is not limited to this, any skilled who is familiar with this art could readily think of variations or substitutions within the disclosed technical scope of the present invention, and these variations or substitutions shall fall within the protection scope of the present invention. Thus, the protection scope of the claims should prevail over the protection scope of the present invention.

What is claimed is:

1. A core network comprising:
a mobility management network element comprising a memory storing instructions and a processor coupled to the memory to execute the instructions to send a session establishment request message to a control plane entity;
the control plane entity, independent of the mobility management network element, comprising a memory storing instructions and a processor coupled to the memory to execute the instructions to:
receive the session establishment request message from the mobility management entity;
in response to the session establishment request message, allocate an internet protocol (IP) address information to a user equipment (UE), generate configuration information of a data path according to the IP address information allocated by the control plane entity,
wherein the configuration information of the data path comprises association information of the data path which comprises the IP address information and one or more IP quintuple filters, and
wherein the association information is used for forwarding data to an associated data path; and
send the configuration information of the data path to a user plane entity, wherein the data path is used for connecting the user plane entity with a radio access network (RAN), and a packet data network; and
the user plane entity, which is located between the packet data network and the RAN and connected with the control plane entity, comprising a memory storing instructions and a processor coupled to the memory to execute the instructions to:
receive the configuration information of the data path, and
forward data of the UE on the data path, in response to the data of the UE being matched with the association information of the data path.

2. The core network of claim 1, wherein the configuration information of the data path further comprises at least one of: identification information for the user plane entity, identification information for a peer network element of the user plane entity on the data path, path information for the data path and the association information for the data path.

3. The core network of claim 2, wherein one or more of the following conditions are satisfied:
the identification information comprises at least one of: an IP address, a media access control (MAC) address, a port number, and a protocol type,
the path information of the data path comprises at least one of: a protocol of the data path, an identifier of the data path, packet data network (PDN) connection information, bearer information, quality of service (QoS) information, service data stream information, and charging manner information, and
the association information of the data path comprises at least one of: association information of the UE with the data path, association information of the service data stream of the UE with the data path, association information between a data path for connecting with the PDN and a data path for connecting with the RAN, association information between the data path for connecting with the PDN and a data path for connecting with another network element, and association information between the data path for connecting with the other network element and the data path for connecting with the RAN.

4. The core network of claim 2, wherein the peer network element comprises at least one of: an RAN network element, a virtual private network (VPN) element, a serving gateway (S-GW), a packet data network gateway (P-GW), a packet data gateway (PDG), and a serving general packet radio service supporting node (SGSN) for data forwarding.

5. The core network of claim 1, wherein the control plane entity is further configured to:
acquire an IP address resource from one of the user plane entity or an internal configuration of the control plane entity, and
allocate the IP address information to the UE from the IP address resource.

6. The core network of claim 1, wherein the user plane entity is further configured to collect use information of the data path, and send the use information to the control plane entity; and the control plane entity is further configured to:
receive the use information,
generate a charging data record according to the use information, and
report the charging data record to a charging system.

7. The core network of claim 1, wherein one or more of the following conditions are satisfied:
the control plane entity comprises at least one of: a control plane gateway, a gateway controller, a control node, and a control gateway; and
the user plane entity comprises at least one of: a user plane gateway, a packet data forwarding gateway, a routing forwarding node and a switch node.

8. The core network of claim 1, wherein the IP address information comprises IPv4 address or IPv6 prefix.

9. A control plane entity located in a core network and independent of a mobility management network element of the core network, comprising:
a processor and a non-transitory computer-readable storage medium including computer-executable instructions executed by the processor to perform, on the control plane entity, operations comprising:
receiving a session establishment request message from the mobility management entity;
allocating an internet protocol (IP) address information to a user equipment (UE) in response to the session establishment request message, and
generating configuration information of a data path according to the IP address information allocated by the control plane entity,
wherein the configuration information comprises association information of the data path which comprises the IP address information and one or more IP quintuple filters, and
wherein the association information is used for forwarding data to an associated data path; and
sending the configuration information of the data path to a user plane entity located in the core network;
wherein the data path is used for connecting the user plane entity with a radio access network (RAN) and a packet data network, and
wherein the user plane entity is located between the packet data network and the RAN.

10. The device of claim 9, wherein the operations executed by the processor further comprise processing a session signalling that comprises at least one of:
a general packet radio service tunnel protocol control (GTP-C) message between the control plane entity and a mobility management network element,
a general packet radio service tunnel protocol user (GTP-U) message transmitted on an interface between the RAN and the user plane entity, and
an IP message between the user plane entity and the packet data network.

11. The device of claim 10, wherein the operations executed by the processor further comprise acquiring a result of authenticating or authorizing the UE by the server in response to a data path being newly established by the UE.

12. The device of claim 11, wherein the operations executed by the processor further comprise acquiring the IP address information from the server, and allocating the IP address information acquired from the server to the UE.

13. The device of claim 10, wherein the operations executed by the processor further comprise:

acquiring policy information from a policy and charging rule function (PCRF) device outside the control plane entity;

acquiring quality of service (QoS) information from the policy information;

a transceiver configured to send the QoS information to the processor, wherein the data path information of the generated configuration information comprises the QoS information; and operations executed by the processor further comprise receiving the QoS information.

14. The device of claim 9, wherein the operations executed by the processor further comprise:

acquiring an IP address resource from one of the user plane entity or an internal configuration of the control plane entity, selecting an IP address information for the UE from the IP address resource, and allocating the selected IP address information to the UE, or the operations further comprise acquiring the IP address information from a server outside the control plane entity and allocate the acquired IP address information to the UE.

15. The device of claim 9, wherein the operations executed by the processor further comprise:

receiving use information of the data path from the user plane entity, generating a charging data record according to the use information, and reporting the generated charging data record to a charging system outside the control plane entity.

16. The device of claim 9, wherein the IP address information comprises IPv4 address or IPv6 prefix.

17. A communication method in a core network comprising a mobility management network element, a control plane entity and at least one user plane entity located between a packet data network and a radio access network (RAN), wherein the control plane entity is independent of the mobility management network element, and the control plane entity is independent of the user plane entity, the method comprising:

receiving, by the control plane entity, a session establishment request message from the mobility management entity;

allocating, by the control plane entity, an internet protocol (IP) address information to user equipment (UE) in response to the session establishment request message;

generating, by the control plane entity, configuration information of a data path according to the IP address information allocated by the control plane entity, wherein the data path is used for connecting the user plane entity with the radio access network (RAN), and the packet data network;

sending, by the control plane entity, the configuration information of the data path to the user plane entity, wherein the configuration information of the data path comprises association information of the data path which comprises the IP address information and one or more IP quintuple filters, and wherein the association information is used for forwarding data to an associated data path;

receiving, by the user plane entity, the configuration information of the data path sent by the control plane entity; and forwarding, by the user plane entity, data of the UE on the data path, in response to the data of the UE being matched with the association information of the data path.

18. The method of claim 17, wherein the configuration information comprises at least one of: identification information of the user plane entity, identification information of a peer network element of the user plane entity on the data path, data path information, and the association information of the data path.

19. The method of claim 18, wherein one or more of the following conditions is satisfied:

the identification information comprises at least one of an internet protocol (IP) address, a media access control (MAC) address, a port number, and a protocol type, the data path information comprises at least one of a data path protocol, a data path identifier, packet data network (PDN) connection information, bearer information, quality of service (QoS) information, service data stream information, and charging manner information, and the association information of the data path comprises at least one of: association information of the UE with the data path, association information of the service data stream of the UE with the data path, association information between a data path for connecting with the PDN and a data path for connecting with the RAN, association information between the data path for connecting with the PDN and a data path for connecting with another network element, and association information between the data path for connecting with the other network element and the data path for connecting with the RAN.

20. The method of claim 18, wherein the peer network element comprises at least one of: an RAN network element, a virtual private network (VPN) element, a serving gateway (S-GW), a packet data network gateway (P-GW), a packet data gateway (PDG), and a serving general packet radio service supporting node (SGSN) for data forwarding.

21. The method of claim 17, wherein allocating the IP address information to the UE in response to the control plane entity receiving the connection establishment request of the UE comprises:

acquiring, by the control plane entity from one of the user plane entity or the internal configuration of the control plane entity, an IP address resource, selecting an IP address information for the UE from the IP address resource, and allocating the selected IP address information to the UE, or acquiring, by the control plane entity, the IP address information from a server outside the control plane entity and allocating the acquired IP address information to the UE.

22. The method of claim 17, further comprising:

collecting, by the user plane entity, use information of the data path;

reporting the use information to the control plane entity;

generating, by the control plane entity, a charging data record according to the use information; and reporting the generated charging data record to a charging system.

23. The method of claim 17, wherein the IP address information comprises IPv4 address or IPv6 prefix.

* * * * *